US009052731B2

(12) United States Patent
Smit

(10) Patent No.: US 9,052,731 B2
(45) Date of Patent: *Jun. 9, 2015

(54) METHOD AND SYSTEM FOR PROGRAMMING AND IMPLEMENTING AUTOMATED FAULT ISOLATION AND RESTORATION USING SEQUENTIAL LOGIC

(71) Applicant: Siemens Industry, Inc., Alpharetta, GA (US)

(72) Inventor: Andre Smit, Raleigh, NC (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/134,612

(22) Filed: Dec. 19, 2013

(65) Prior Publication Data

US 2014/0136006 A1 May 15, 2014

Related U.S. Application Data

(63) Continuation of application No. 13/085,603, filed on Apr. 13, 2011, now Pat. No. 8,634,175.

(51) Int. Cl.
*H02H 7/00* (2006.01)
*G05F 1/66* (2006.01)
*H02H 7/26* (2006.01)
*H02H 1/00* (2006.01)

(52) U.S. Cl.
CPC ............... *G05F 1/66* (2013.01); *H02H 1/0084* (2013.01); *H02H 1/0092* (2013.01); *H02H 7/262* (2013.01)

(58) Field of Classification Search
CPC ...................................................... H02H 7/262
USPC ............................................................ 361/66
See application file for complete search history.

(56) References Cited

U.S. PATENT DOCUMENTS 6,469,629 B1 * 10/2002 Campbell et al. ............. 340/635
7,906,970 B2 * 3/2011 Gangadharan et al. ....... 324/418
8,462,475 B2 * 6/2013 Komatsu et al. ................ 361/68

* cited by examiner

Primary Examiner — Stephen W Jackson

(57) ABSTRACT

A method and system for programming and implementing automated fault isolation and restoration of high-speed fault detection of circuits in power distribution networks using sequential logic and peer-to-peer communication is provided. High-speed fault detection of circuits in power distribution networks uses protective relay devices (14) segmenting a distribution line (11) having Intelligent Electronic Devices (IED) (22) associated with switching devices (20) communicating peer-to-peer via a communication system (30) to provide fast and accurate fault location information in distribution systems with sequential logic.

20 Claims, 14 Drawing Sheets

METHOD AND SYSTEM FOR PROGRAMMING AND IMPLEMENTING AUTOMATED FAULT ISOLATION AND RESTORATION USING SEQUENTIAL LOGIC

The present application is a continuation of and claims priority to U.S. patent application Ser. No. 13/085,603, filed Apr. 13, 2011, which is hereby incorporated by reference herein in its entirety for all purposes.

FIELD OF THE INVENTION

This invention relates to distribution systems and more particularly to a method and system for programming and implementing automated fault isolation and service restoration of high-speed fault detection of circuits in power distribution networks using sequential logic in a decentralized programmable logic controller (PLC) structure and peer-to-peer communication.

BACKGROUND OF THE INVENTION

Protection of power distribution systems involves detecting, locating and initiating the removal of a fault from the power system. Identifying the location of faults is an important process. Protective relays are extensively used for major protective functions. Protection systems and circuit breakers are installed at strategic locations along the feeder for the purpose of detecting faults that cause excess current to flow and to automatically disconnect them from the source. Manual operations are usually required to isolate the faulty section and this can take several hours during which time many customers are without electricity.

Time grading techniques are often used to minimize the number of customers disconnected when isolating a fault. Time graded protective systems have protective devices in successive zones that are arranged to operate in times which are graded through the sequence of equipment so that upon the occurrence of a fault only those relevant to the faulty zone complete the tripping function. A disadvantage of time grading schemes is that they are slow to identify faulted zones and due to the time separation required and it is assumption that there is a single source feeding the system. This method is not suitable when dealing with multiple variable sources like wind and solar generation and will require continual adaptive setting changes in real time.

A problem of slow isolation and restoration of distribution power system faults leads to lengthy unwanted power outages. It is today still typical for these actions to be performed by linemen driving in trucks from switch to switch. Power outages for the most part leads directly to loss in revenues to Utilities, fines imposed by regulators on utilities and loss in production on the part of electrical consumers like factories that are dependent on a constant supply of electrical power.

The problem to create a smart distribution grid has been hampered by the use of old communications systems, protocols and communication infrastructures. The problem that we have today in distribution feeders is that the systems do not have the capability to inelegantly isolate faulted sections and restore these feeders after a fault has been cleared from the system. The procedure of isolation and restoration have for a large extent been a slow manual process either carried out through manual switching in the field by line man or utility technicians/electricians or switching remotely by an operator through a Distribution control center connected to very simple RTU of small PLC type of field device. Several attempts have been made to create centralized systems that would gather data for the field devices and then process this information centrally in logic equations to perform so called "distribution feeder automation". These systems are all notoriously slow to gather the data from the field and present in to the Control Center. It could take many minutes before a fault could be isolated through repeated switching on to a fault using an elimination process to isolate the fault.

Current Systems act extremely slowly and my take minutes to react to changing system conditions. This is undesirable and cause unwanted power outages while faults are being isolated or restored. Manual switching at the switch or remote switching from a SCADA control system is commonly used. Non-communicating systems called loop automation systems are used with reclosers. These systems act on presence of voltage measured at the switching point and local logic. Current smart systems use specially adapted communication protocols like DNP3 to communicate between devices to achieve restricted logic. These systems are vendor specific and are not open for adaptation or modification by the user as his needs might change. These systems are also restricted to a small number of switching devices. The system also relies on a master device to perform desired logic.

A number of systems exist dealing with fault detection of circuits in power distribution networks such as those described in U.S. Pat. Nos. 6,603,649; 6,687,573; 6,697,240; 7,636,616; 7,773,360; 2008/0024142; and 2009/0290275, all of which are incorporated herein by reference.

There is a need in the art for a scheme that can clearly detect a faulted zone in a shorter time and with less impact on the connected power grid and that is also immune to the effect of the introduction of distributed generation in distribution feeder networks. There is also a need in the art for a system that will not require a master or token type of arrangement.

The present invention addresses those needs.

SUMMARY OF THE INVENTION

Broadly speaking, the invention provides a method and system for programming and using automated fault isolation and restoration of high-speed fault detection of circuits in power distribution networks using peer-to-peer communication.

This invention improves the power outage times dramatically by providing a true "smart grid" solution. By combining hardware, software and communication building blocks with new and innovative logic equations, a technical solution as well as a delivery process of creating new fast operating peer to peer based distribution feeder automation systems is provided.

The invention provides a distribution feeder automation system that is based on a peer-to-peer communication network that can isolate faulted feeder sections and provide faster isolation of faults and faster restoration of the feeders after a fault was removed than available in the market today. This method can be used to greatly enhance the fast deployment to provide a means to speed up the development of the US "Smart Grid." This invention will also provide a backbone to develop new and more innovative protection solutions to further enhance the future "Smart Grid"

In an embodiment of the present invention, protective relay devices are associated with automatic switches/reclosers, such as in an overlapping zone of protection configuration, where the protective relay devices include microprocessors and may be referred to as Intelligent Electronic Devices (IED). Such microprocessors may comprise, for example, programmable logic controllers (PLCs) for the associated control design. A high-speed communication system (such as fiber link, WiMax, WiFi, or other wired or wireless carrier technologies or a mix thereof) is provided between the protective relay devices for peer-to-peer communication. The protective relay devices are capable of exchanging messages, for example, GOOSE (Generic Object Oriented Substation Event) messages under the IEC61850 Standard. The protective relay devices are then adapted to test for faults in a unique manner and communicate with each other to provide fast and accurate fault location information in distribution feeder systems.

The invention can be implemented in numerous ways, including as a system, a device/apparatus, a method, or a computer readable medium. Several embodiments of the invention are discussed below.

In an embodiment, the invention comprises a method for programming and implementing automated fault isolation and service restoration in power distribution networks having protective relay devices comprising processing and communication capabilities and associated with switching devices, comprising: (a) storing, based on a topology of a power distribution network, information to be used in automated fault isolation and service restoration, comprising operation mode information, system status information, and fault information; (b) grouping operation mode information, system status information, and fault information into functional groups for messaging; (c) programming into each of the protective relay devices a plurality of operational sequences that when executed control associated switching devices when a fault detection element identifies a faulted section in the network, wherein each operational sequence is based on operation mode information, system status information, and fault information; (d) sharing operation mode information, system status information, and fault information via peer-to-peer messaging between all of the protective relay devices via a high speed communication system; and (e) executing a sequential isolation operation comprising a proper operational sequence based on mode information, system status information, and fault information to isolate the faulted section in a series of sequential steps.

In an embodiment, the system status information comprises a position of each primary switching device on a feeder; the fault information comprises fault positions detected and is used as a trigger to start the sequential isolation operation; and the operation mode information comprises one or more of automatic mode, sectional control mode, restoration mode, storm mode, simulation mode, and load balancing mode.

More specifically, the operation mode information comprises one or more of automatic mode that provides for automatic operation to detect, isolate, and restore faults; sectional control mode that provides for opening of a line section to preprogrammed logical steps; restoration mode that provides for restoration to a normal state once the fault has been repaired; storm mode that provides for changing operation of the protection as well as the operational sequences; simulation mode that provides for testing the operational sequences; and load balancing mode that provides for indication of a best possible open point in a feeder to distribute a load evenly between two sources.

In a further embodiment, the operational sequences comprise logic sequences implemented using a plurality of logic gates. The logic gates comprise logic AND gates representing a binary information string programmed into relay logic that when fulfilled will cause an operation of a switch device and together with the switching devices of the system creates a distributed sequential logic system. The logic information is configured to a binary output of the relay that is connected to a primary switch operating circuits to close or open the primary switch. One or more of reclosers, switches and circuit breakers are activated to isolate the faulted section in a series of sequential steps. The protective relay devices comprise intelligent devices having a microprocessor and a communication system.

In a further embodiment, the invention comprises a system for programming and implementing automated fault isolation and service restoration in power distribution networks, comprising a plurality of protective relay devices in a power distribution network, each protective relay device comprising a processor and associated with switching devices for fault isolation and service restoration; a communication device associated with each protective relay device that provides peer-to-peer communication between the protective relay devices, wherein messaging in the communication device comprises defined functional groups that group operation mode information, system status information, and fault information defined based on a topology of the power distribution network, information to be used in automated fault isolation and service restoration, wherein each communication device provides for sharing of operation mode information, system status information, and fault information via peer-to-peer messaging between all of the protective relay devices via a high speed communication system; wherein each protective relay device has programmed therein a plurality of operational sequences that when executed control associated switching devices when a fault detection element identifies a faulted section in the network, wherein each operational sequence is based on operation mode information, system status information, and fault information, such that a sequential isolation operation comprising a proper operational sequence based on mode information, system status information, and fault information is executed to isolate the faulted section in a series of sequential steps.

A tangible computer-readable medium is also provided in an embodiment that comprises instructions that when executed by a processor implement the steps the invention. The methods of the present invention may be implemented as a computer program product with a tangible (non-transitory) computer-readable medium having code thereon.

As an apparatus, the present invention may include microprocessor-based protective devices or RTU's or PLC' programmed in accordance with the steps of the present invention.

Accordingly, an advantage of the present invention is that the method can clearly detect a faulted zone in a shorter time with less impact on the connected power grid that is immune system impedance and source variations. Further advantages include an increased number of switching devices, high speed operation (Operating speeds in milliseconds as opposed to seconds or minutes), high-speed fault detection and isolation, and open Protocol (e.g., IEC61850).

Other aspects and advantages of the invention will become apparent from the following detailed description taken in conjunction with the accompanying drawings, illustrating, by way of example, the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

In order that the manner in which the above recited and other advantages and objects of the invention are obtained, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 10a-10d show IED programming for isolation and restoration, wherein FIG. 10b through FIG. 10d are continuations of FIG. 10a.

DETAILED DESCRIPTION OF THE INVENTION

Broadly speaking, the invention provides a method and system for programming and using automated fault isolation and restoration of high-speed fault detection of circuits in power distribution networks using peer-to-peer communication. The method and apparatus comprises high-speed fault detection of circuits in power distribution networks utilizing Intelligent Electronic Devices (IED) associated with switching devices communicating peer-to-peer to provide fast and accurate fault location information in feeder distribution systems over wireless communication networks. Sequential logic provides intelligent reclosing and load transfer schemes.

A typical feeder system is supplied by a substation through a circuit breaker and includes at least three of the following types of switching devices distributed along the line: reclosers, disconnect switches, sectionalizers, airbreak switches, and fuses. In addition capacitor banks and voltage regulators are included in most installations.

A system equipped with Distribution Feeder Automation would also include equipment for the detection, location, and isolation of faults, and a means to restore power to undamaged sections of the lines. This additional functionality is referred to as Fault Location, Isolation, and Supply Restoration (FLISR). Other typical system components include VAR dispatch and control equipment to maintain power factor, and control gear to regulate line voltage.

Figure 1A:
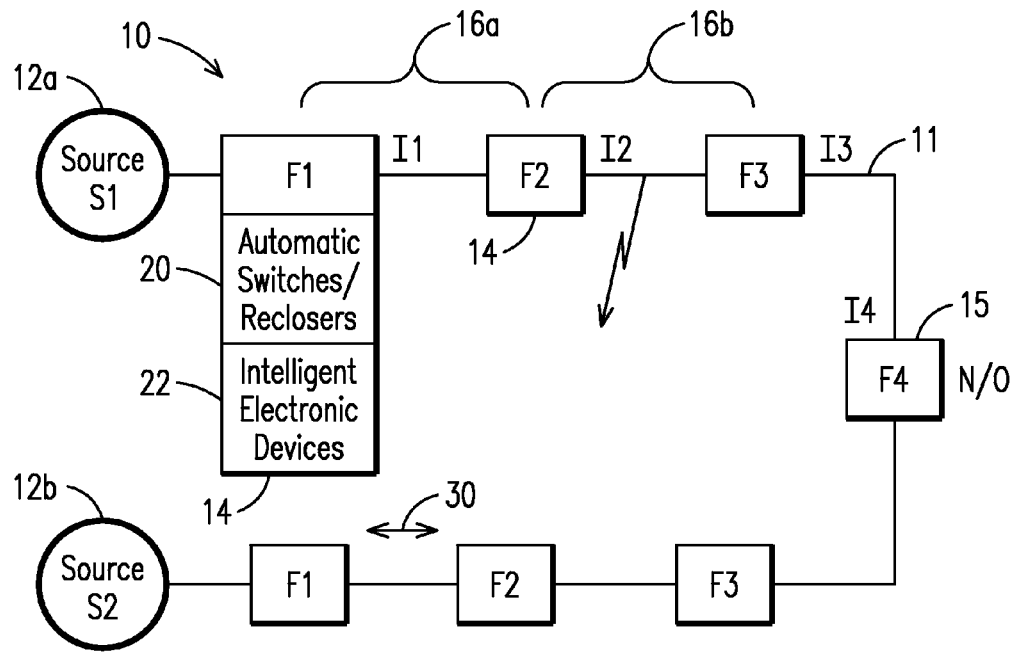
FIG. 1a is a block diagram of an embodiment of the invention.

FIG. 1a shows a simplified view of a portion of an exemplary electrical power distribution system 10 that includes fault protection devices 14 (F1, F2, F3 . . . ). Generally, in such an arrangement, a source 12a (S1) is coupled to a distribution line 11 along with an alternate source 12b (S2) coupled to the distribution line 11 by a normally open device 15 (N/O) and fault protection devices 14 (F1, F2, F3 . . . ) segment the distribution line 11 into segments/zones (Zone 1-2, Zone 2-3, etc.) including 16a (Stable Zone 1-2), 16b (Faulted Zone 2-3). In this example, the distribution system 10 comprises a plurality of sources 12a, 12b of electrical power, shown herein as sources 51, S2 connected to a plurality of users or loads (e.g., factories, homes, etc., not shown) through an electrical distribution line 11 such as conventional electrical power lines. Distribution line 11 has a plurality of fault protection devices/protective relay devices 14 (individually labeled F1, F2, . . . FN) placed at predetermined points along the line, including for example a normally open N/O switch F4 in this particular arrangement. The depiction of the number and arrangement of sources, users, lines and devices in FIG. 1a is arbitrary and there may be many different configurations and virtually any number of each of these components in any given distribution system.

The protective relay devices 14 are associated with automatic switches/reclosers 20 (e.g., a group of reclosers, switches, or a combination of both, within a loop), such as in an overlapping zone of protection configuration. The protective relay herein preferably comprises microprocessor based devices such as an Intelligent Electronic Devices 22 (IEDs—any device incorporating one or more processors with the capability to receive or send data/control from or to an external source) having a programmable logic controller (PLC) and a communication processor and protocol such as an IEC 61850 (open standard as a part of the International Electrotechnical Commission's (IEC) Technical Committee 57 (TC57) reference architecture for electric power systems) communication processor. The PLC of the IED 22 mainly comprises a CPU, memory areas, and appropriate circuits to receive input/output data. The processors in the protective devices perform certain logical tasks based on their programming. Numerous input terminals receive inputted logical states from sensors and switches (e.g., "0"/"1", or "on"/"off"). Output terminals initiate events such as to trip a circuit. Protective relays 14 are devices that are used as a sensing element to detect abnormal conditions in the distribution system. An automatic circuit recloser 20 is a self-contained device that can sense and interrupt fault currents as well as re-close automatically in an attempt to re-energize a line.

The protective relay device 14 is connected with current and voltage sensors, or voltage transformers (VTs) and current transformers (CTs), not shown, to monitor the flow of power. The current and voltage sensors provide the necessary input of data used to determine logic sequences in fault detection. The loop generally can contain 3-20 switching devices within one group of devices or loop. A typical feeder has 7-10 switching stations.

Figure 1B:
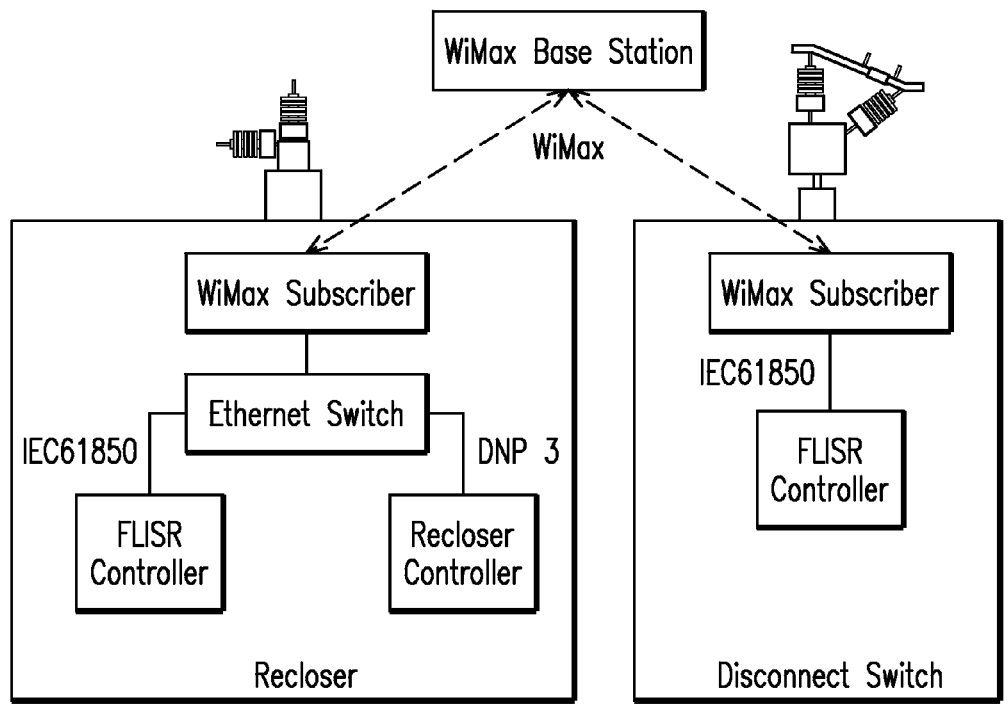
FIG. 1b is an example WiMAX wireless communication infrastructure and components used in a FLISR system.

A high-speed communication system 30 (such as fiber link, WiMax, WiFi, or other wired or wireless carrier technologies or a mix thereof) is provided between the devices for peer-to-peer communication. Generally speaking, such a distribution network with peer-to-peer communication capabilities is disclosed in commonly owned, co-pending U.S. application Ser. No. 12/967,191 filed Dec. 14, 2010 and described in further detail herein. See for example FIG. 1b. Information is then made available to each of the other intelligent devices, over the communications channel located within that particular loop. For example, an Ethernet backbone can be linked over a twisted pair type copper cable, fiber or an Internet protocol (IP)-based radio system, broadband over power line (BPL) or digital subscriber line (DSL). The devices 14 are capable of exchanging messages, for example, GOOSE (Generic Object Oriented Substation Event) messages under the IEC61850 Standard (These protocols can run over TCP/IP networks and/or substation LANs using high speed switched Ethernet to obtain the necessary response times of <4 ms for protective relaying). Peer-to-peer functionality via IEC 61850 generic-object-oriented substation event (GOOSE) messages provides not only binary data, but analog values as well. There is thus no need for a master-slave arrangement since IEC 61850 provides peer-to-peer communications capability. Since the devices all communicate in a peer-to-peer manner, some of the input devices that would normally be required in a loop-automation system can be eliminated.

The devices 14 are configured to test for faults using differential protection (i.e., electrical quantities entering and leaving the protected zone are compared and if the net is zero, it is assumed no fault exists) and communicate with each other to provide fast and accurate fault location information in distribution systems.

Figure 1C:
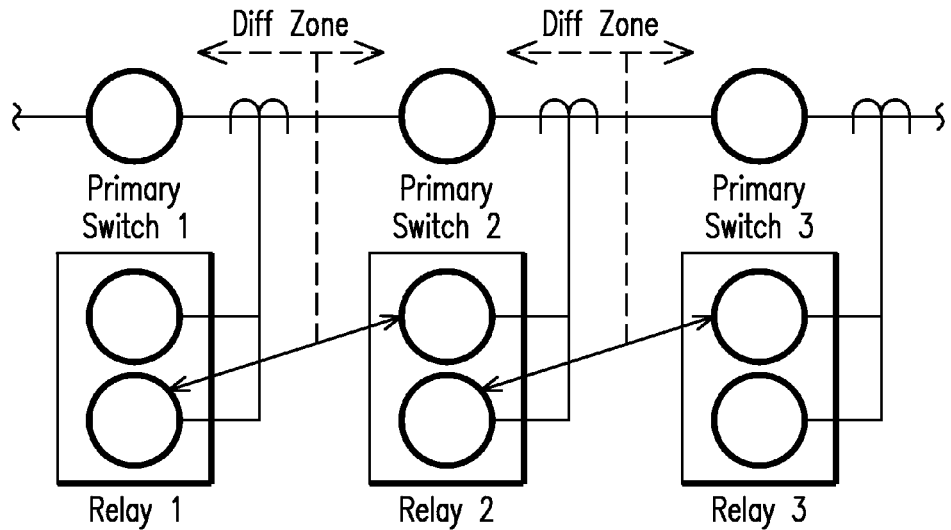
FIG. 1c is a block diagram of a differential method of fault detection using three relays.

The differential method can detect faulty line sections. In an embodiment, three relays are used to provide fault detection functionality for two line sections. Data communication between relays (such as Differential Relay/ANSI-87) includes messaging over a wireless network (such as IEC61850 GOOSE messaging) to transfer all analog and binary information between devices. See for example FIG. 1c. The self healing logic may reside in the individual intelligent electric device (IED) groups located in the feeder loops. The IEDs 22 handle the self-healing functionality and attempt to clear faults, isolate and then, after the fault is removed, initiate the restoration logic. Fault location information is processed in milliseconds with differential equations using peer-to-peer communications between switching points. The system performs the functions of fault detection, isolation and restoration (FDIR) with decentralized automation, sometimes described as Fault Location Isolation and Service Restoration (FLISR). The individual self-healing loop breaks the grid into manageable segments and allows the utility to further define the healing process logic for its distribution system.

Each PLC contains multiple AND gates that perform switching steps, which when combined, create logical sequences that control the isolation and restoration processes. Sequences for load balancing and load transfer can also be programmed. Thus, the system has complete flexibility to execute desired sequences based ion operating mode, fault information, and system status combined simply at a single AND gate.

Each relay can be programmed to operate in different modes to satisfy system and environmental requirements as directed by a remote control point or SCADA system. Operating modes include auto (FLISR), remote, manual, restoration, load control, load balancing, storm, and the like.

Figure 2A:
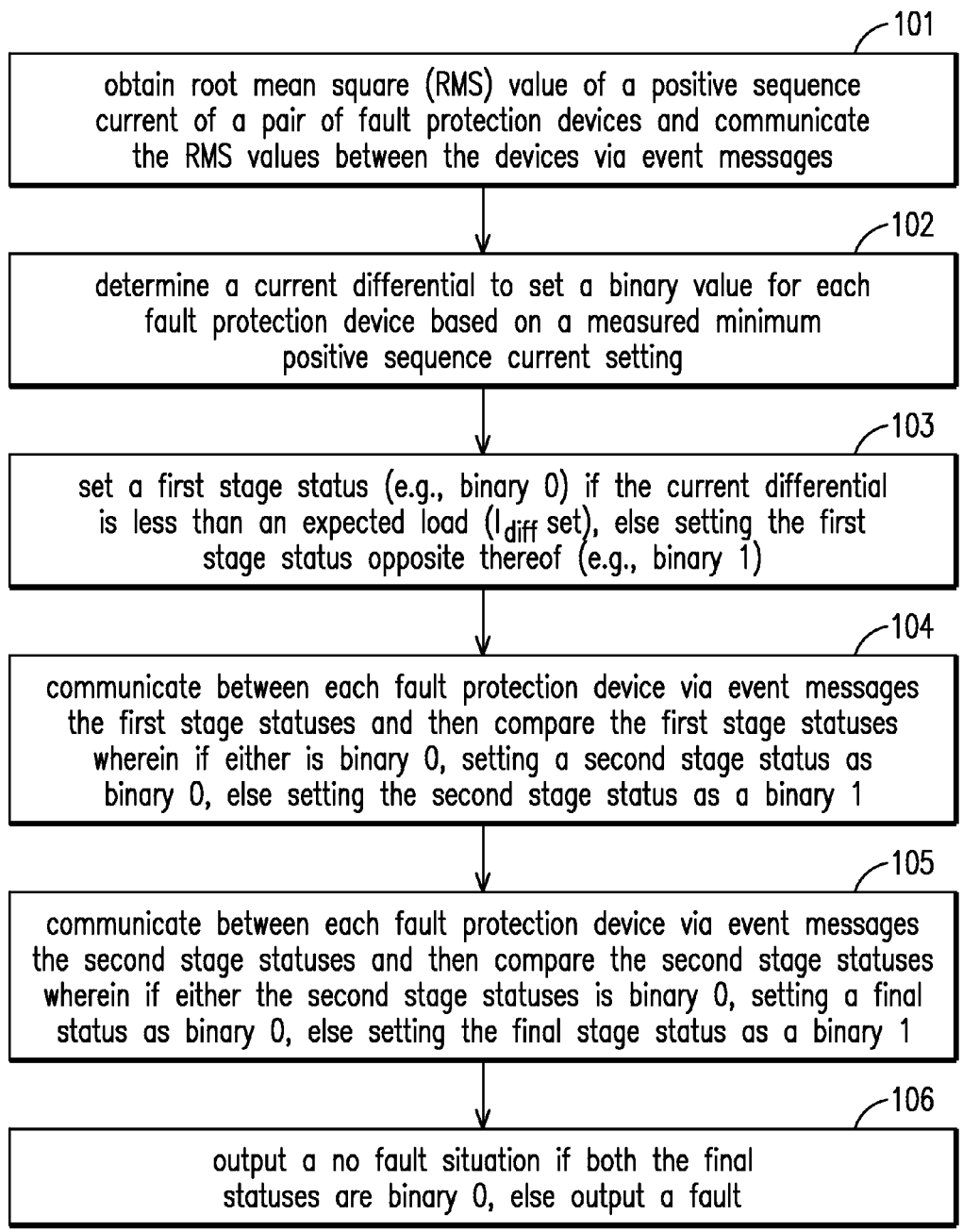
FIG. 2a is a flow chart showing the steps of an embodiment of the invention.
Figure 2B:
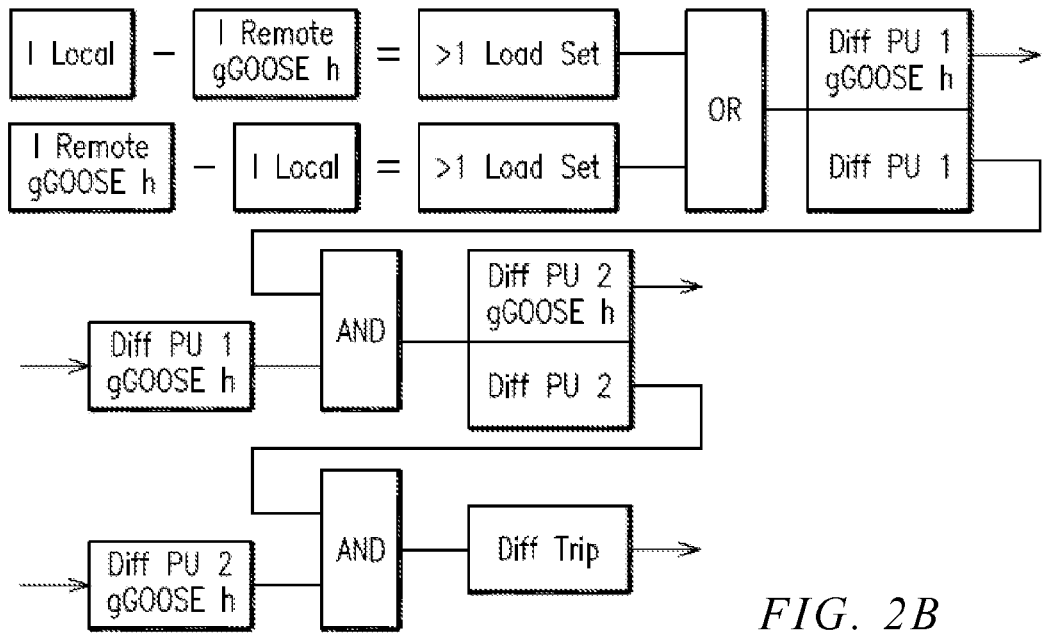
FIG. 2b is a block diagram of a three stage measured RMS differential method of fault detection.
Figure 2C:
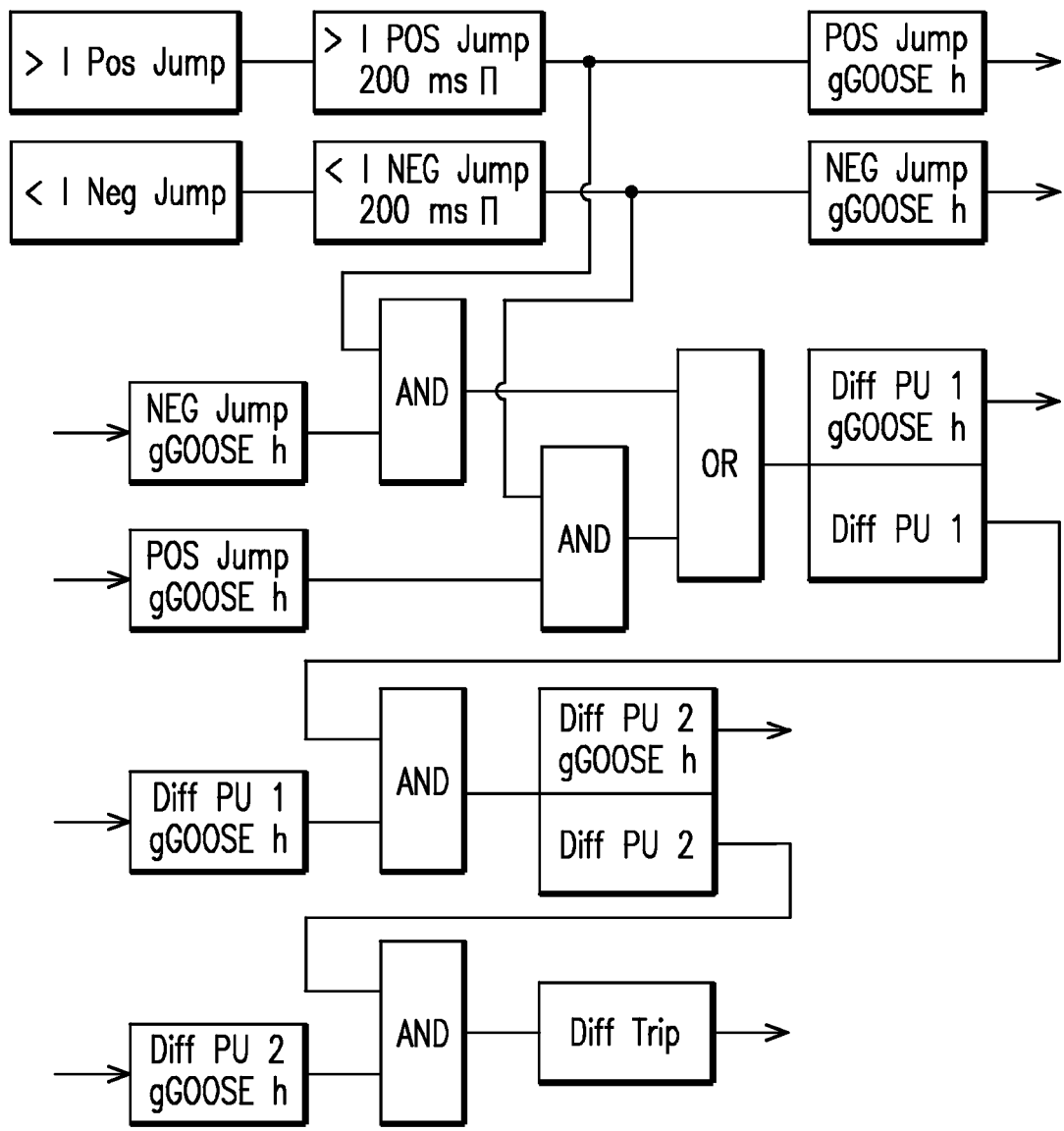
FIG. 2c is a block diagram of a three-stage jump detector method of fault detection.

Referring to FIG. 2a-2c, the testing method used herein for faults essentially comprises three stages. The method detects faults in a power distribution system 10 having at least one source 12a coupled to a distribution line 11 comprising a plurality of fault protection devices 14 segmenting the distribution line 11 into a plurality of protected zones 16a, 16b, the fault protection devices 14 having processing and communication capabilities and associated with switching devices 20. In the method, for each protected zone 16a, 16b defined by a pair of fault protection devices 14 on either end, a first local fault protection device 14 (F1) on a first end and a second remote fault protection device 14 (F2) on a second end, the steps include STEP 1 (101) receiving as input a local root mean square (RMS) value of a positive sequence current $I_1$ of the first local fault protection device and a remote RMS value of the positive sequence current $I_2$ of the second remote fault protection device, wherein the RMS values are communicated between the fault protection devices via event messages; STEP 2 (102) determining for each fault protection device of the pair a current differential between current $I_1$ and current $I_2$ to set a binary value for each fault protection device of the pair based on a measured minimum positive sequence current setting; STEP 3 (103) setting individually for each fault protection device a first stage status of binary 0 if the current differential is less than an expected load ($I_{diff}$ set) in this zone, else setting the first stage status as a binary 1; STEP 4 (104) communicating between each fault protection device via event messages the first stage statuses and then comparing the first stage statuses wherein if either fault protection device has the first stage status of binary 0, setting individually for each fault protection device a second stage status as binary 0, else setting the second stage status as a binary 1; STEP 5 (105) communicating between each fault protection device via event messages the second stage statuses and then comparing the second stage statuses wherein if either fault protection device has the second stage status of binary 0, setting individually for each fault protection device a final status as binary 0, else setting the final status as a binary 1; and STEP 6 (106) indicating a no fault situation if both the final statuses are binary 0, else indicating a fault. Other embodiments are variations of these steps as shown in the following tables.

These steps are essentially executed in three stages. At stage 1, local RMS value of the positive sequence $I_1$ current is subtracted from upstream RMS value of the positive sequence current and given a value (e.g., 1 or 0) based on a measured minimum positive sequence current setting. GOOSE messages may be used to distribute RMS values. In addition the positive and negative jump associated with the individual phase currents or positive sequence currents caused by a fault will be detected and shared and can be used as a AND or OR function throughout the remaining stages.

At Stage 2, the results from both line ends are then added and compared to form a result at each point. Binary values are used.

At Stage 3, the results from Stage 2 are then added and compared again at each point to form the final local result wherein a binary 1 or high will indicate a faulted zone. This method will allow indication of a faulted zone within a 200 msec time frame over a wireless communication network.

For a stable zone as between F1 and F2 in FIG. 1 and with reference to FIG. 2, the following tables represent the sequence of steps:

TABLE 1a

Stable Zone 1-2

| Stage | F1 | F2 |
|---|---|---|
| Stage 1 (RMS value of the Zero sequence current used) | $I_{diff}$ for F1-2<br>= I1- >>I2<br>=(1PU – 1PU) > Idiff set<br>= 0 | $I_{diff}$ for F2-1<br>= I2- >>I1<br>=(1PU – 1PU) > Idiff set = 0 |
| Stage 2 (binary 1 or 0) | F1-2 AND >>F2-1<br>= 0 AND >>0<br>=0 (no fault) | F2-1 AND >>F1-2<br>= 0 AND >>0<br>=0 (no fault) |
| Stage 3 (binary 1 or 0) | Faulted Zone<br>=0 AND >>0<br>= 0 (1=Fault) | Faulted Zone<br>=0 AND >>0<br>= 0 (1=Fault) |

(Note:
>> indicates a GOOSE value PU = per unit)

Table 1a Description:

This table describes the how the IED's will react to a fault outside the zone of protection. In this instance the current measured in both devices will increase at the same time and with the same magnitude. The following stages indicate how the IED's calculate the current differential and compare the results at least two times within about a 200 msec time window to reach a final result. The positive sequence current is used in this to keep the GOOSE traffic to a minimum, individual phase measurements can be used if desired. This is the first and only stage that measured values are used. The direction is assumed to be non critical in this radial application. Direction is determined by each IED to be forward or reverse through the system topology. The directional measurement acts as an inverter of the measured value should the direction change. This function is used in non radial systems.

Stage 1:

The GOOSE value from the remote IED is now subtracted from the locally measured current. The difference value should be less than the expected load ($I_{diff}$ set) in this line section. If this is true the IED will issue a binary 0 value. The remote IED will perform the exact same calculation as described above. Each IED will then issue a binary 0 value for $I_{diff}$. In Table 1a we reach a binary 0 result in both relays.

Stage 2:

In this stage the differential results $I_{diff}$ or stage 1 is compared between the two IED's. Each IED will compare its $I_{diff}$ result to that of the other $I_{diff}$ from the received GOOSE. If either of the $I_{diff}$ values are 0 this stage will issue a 0 as a result. In Table 1a we reach a binary 0 result in both relays.

Stage 3:

In this stage the stage 2 results are compared between the two IED's. Each IED will compare its stage 2 result to that of the other IED's received GOOSE. If either of the stage 2 values are 0 this stage will issue a 0 as a result. A zero result indicate a no fault situation. In table 1a we reach a binary 0 result in both relays.

TABLE 1b

Stable Zone 1-2

| Stage | F1 | F2 |
|---|---|---|
| Stage 1 (RMS value of the phase currents used) | Iph a (measured)<br>F1aPJ = Ia > ΔIt pos<br>= +1<br>And<br>F1aNJ = Ia <ΔIt neg<br>= 0 | Iph a (measured)<br>F2aPJ = Ia > ΔIt pos<br>= +1<br>And<br>F2aNJ = Ia <ΔIt neg<br>= 0 |
| Stage 2 (binary 1 or 0) | Compare PJ F1 and >> NJ F2<br>If F1aPJ = 1 AND >>F2aNJ =1 then 1 = F1a diff fault 1-2<br>F1aPJ AND >>F2aNJ<br>= 1 AND 0<br>= 0 (1=F1 a diff fault 1-2))<br>No Diff Fault | Compare PJ F2 and >> NJ F1<br>F2aPJ AND >>F1aNJ<br>If F2aPJ = 1 AND >>F1aNJ =1 then 1 = F2a diff fault 2-1<br>F2aPJ AND>>F1aNJ<br>1 AND 0<br>= 0 (1=F2a diff fault 2-1)<br>No Diff Fault |
| Stage 3 (binary 1 or 0) | Compare F1 a Diff Fault 1-2<br>and >>F2a Diff Fault 2-1<br>If F1a Diff F1-2 =1 AND >>F2a Diff F2-1 =1 then Diff Fault 1-2<br>0 AND 0<br>=0= F1a Diff Fault 1-2<br>=No Diff Fault | Compare F2 a Diff Fault 2-1<br>and >>F1a Diff Fault 1-2<br>If F2a Diff F2-1 =1 AND >>F1a Diff F1-2 =1 then Diff Fault 1-2<br>0 AND 0<br>=0= F1a Diff Fault 1-2<br>=No Diff Fault |

(Note:
>> indicates a GOOSE value, PJ = Postive Jump, NJ = Negative Jump)

Table 1b Description:

The table describes the jump detector method to identify a faulted line section. The method shares only binary GOOSE information between IED's to get to a final result. The method is not affected by the direction of current as long as only 1 source is connected to the feeder. This method comprises a local measurement to detect a sudden change or jump in current in both positive or negative direction. These jumps are sent to the adjacent IED's via GOOSE for processing. Each jump will only be active for a predetermined time as a pulse. Two IED's must agree during this pulse period that a fault is present.

Stage 1:

In this stage each IED measures the phase currents for a positive jump or current increase and a negative jump or current decrease that is more than the preset $\Delta I_r$ value. Should the jump be more than the $\Delta I_r$ value, a 1 or 0 binary value is generated for both the positive jump and negative jumps. These two jump indicators are pulse outputs and will remain high for a preset time. In Table 1b we reach a binary 1 for positive jumps in both relays and binary 0 result in both IED's for negative jumps.

Stage 2:

In this stage the positive and negative jump information is compared through an AND function. The positive jump and negative jump signals form the local IED and the remote IED are put through two AND gates. The AND gates will produce a binary 1 if there is local positive jump AND a remote negative jump, OR a local negative jump AND a remote positive jump. This signal indicates a diff fault present as measured at either IED. In Table 1 b we reach a binary 0 result in both relays.

Stage 3:

In this stage the stage 2 final output signals are used in an AND function to finally determine the presence of a diff fault. If both IED's agree that a fault is present a final Diff Fault for the line section is issued by both devices. In Table 1b we reach a binary 0 result in both relays thus no fault.

For a faulted zone as between F2 and F3 in FIG. 1a and with reference to FIG. 2a-2c, the following tables represent the sequence of steps:

Table 2a Description:

This table describes the how the IED's will react to a fault inside the zone of protection. In this instance the current measured in one IED will increase and at the same time the current at the other IED will decrease. The current will flow into the actual fault and not reach this IED at position 3. The following stages indicate how the IED's calculate the current differential and compare the results at least two times within a 200 msec time window to reach a final result. The positive sequence current is used in this to keep the GOOSE traffic to a minimum, individual phase measurements can be used if desired. Preferably, this is the first and only stage that measured values are used. The direction is assumed to be non critical in this radial application. Direction is determined by each IED to be forward or reverse through the system topology. The directional measurement act as an inverter of the measured value should the direction change. This function is used in non radial systems.

Stage 1:

The GOOSE value from the remote IED is now subtracted from the locally measured current. The difference value should be less than the expected load ($I_{diff}$ set) in this line section. If this is false the IED will issue a binary 1 value. The remote IED will perform the exact same calculation as described above. Each IED will then issue a binary 1 value for $I_{diff}$. In Table 2a we reach a binary 1 result in both relays.

Stage 2:

In this stage the differential results $I_{diff}$ or stage 1 is compared between the two IED's. Each IED will compare its $I_{diff}$ result to that of the other $I_{diff}$ from the received GOOSE. If both of the $I_{diff}$ values are 1 this stage will issue a 1 as a result. In Table 2a we reach a binary1 result in both relays.

Stage 3:

In this stage the stage 2 results are compared between the two IED's. Each IED will compare its stage 2 result to that of the other IED's received GOOSE. If both of the stage 2 values are 1 this stage will issue a 1 as a result. A 1 result indicates a fault situation. In Table 2a we reach a binary1 result in both relays.

TABLE 2a

| | Faulted Zone 2-3 | |
|---|---|---|
| Stage | F2 | F3 |
| Stage 1 (RMS value of the Zero sequence current used) | Idiff for F2-3<br>= I2- >>I3<br>=(1PU − 0PU) > Idiff set(+ OR −) = 1 | Idiff for F3-2<br>= I3- >>I2<br>=(0PU − 1PU) > Idiff set (+ OR −) = 1 |
| Stage 2 (binary 1 or 0) | F2-3 AND F3-2 (goose)<br>= 1 AND >>1<br>=1 (Zone fault) | F3-2 AND F2-3 (goose)<br>= 1 AND >>1<br>=1 (Zone fault) |
| Stage 3 (binary 1 or 0) | Faulted Zone<br>=1 AND >>1<br>= 1 (1=Fault) | Faulted Zone<br>=1 AND>>1<br>= 1 (1=Fault) |

(Note:
>> indicates a GOOSE value PU = per unit)

TABLE 2b

Faulted Zone 2-3

| Stage | F2 | F3 |
|---|---|---|
| Stage 1 (RMS value of the phase currents used) | Iph a (measured)<br>F2aPJ = Ia > ΔIt pos<br>= +1<br>And<br>F2aNJ = Ia <ΔIt neg<br>= 0 | Iph a (measured)<br>F3aPJ = Ia > ΔIt pos<br>= 0<br>And<br>F3aNJ = Ia <ΔIt neg<br>= 1 |
| Stage 2 (binary 1 or 0) | Compare PJ F2 and >> NJ F3<br>If F2aPJ = 1 AND >>F3aNJ =1 then 1 = F1a diff fault 1-2<br>F2aPJ AND >>F3aNJ<br>= 1 AND 1<br>= 1 (1=F1a diff fault 1-2))<br>Diff Fault detected | Compare PJ F3 and >> NJ F2<br>F3aPJ AND >>F2aNJ<br>If F3aPJ = 1 AND >>F2aNJ =1 then 1 = F3a diff fault 2-1<br>F3aPJ AND >>F2aNJ<br>1 AND 1<br>= 1 (1=F2a diff fault 2-1)<br>Diff Fault detected |
| Stage 3 (binary 1 or 0) | Compare F2 a Diff Fault 2-3 and >>F2a Diff Fault 3-2<br>If F1a Diff F2-3 =1 AND >>F2a Diff F3-2 =1 then Diff Fault 2-3<br>1 AND 1<br>=1= F1a Diff Fault 2-3<br>= Diff Fault | Compare F2 a Diff Fault 3-2 and >>F1 a Diff Fault 2-3<br>If F2a Diff F3-2 =1 AND >>F1a Diff F2-3 =1 then Diff Fault 2-3<br>1 AND 1<br>=1= F1a Diff Fault 1-2<br>=Diff Fault |

(Note:
>> indicates a GOOSE value)

Table 2b Description:

The table describes the jump detector method to identify a faulted line section. The method shares only binary GOOSE information between IED's to get to a final result. The method is not affected by the direction of current as long as only 1 source is connected to the feeder. This method comprises a local measurement to detect a sudden change or jump in current in both positive or negative direction. These jumps are sent to the adjacent IED's via GOOSE for processing. Each jump will only be active for a predetermined time as a pulse. Two IED's must agree during this pulse period that a fault is present.

Stage 1:

In this stage each IED measures the phase currents for a positive jump or current increase and a negative jump or current decrease that is more than the preset $\Delta I_t$ value. Should the jump be more than the $\Delta I_t$ value, a 1 or 0 binary value is generated for both the positive jump and negative jumps. These two jump indicators are pulse outputs and will remain high for a preset time. In Table 2b we get for F2 a binary 1 for a positive jump and a binary 0 for the negative jump and in F3 we get a binary 0 for a positive jump and a binary 1 for the negative jump.

Stage 2:

In this stage the positive and negative jump information is compared through an AND function. The positive jump and negative jump signals form the local IED and the remote IED are put through two AND gates. The AND gates will produce a binary 1 if there is local positive jump AND a remote negative jump, OR a local negative jump AND a remote positive jump. This signal indicates a diff fault present as measured at either IED. In Table 2b we reach a binary 1 result in both relays.

Stage 3:

In this stage the stage 2 final output signals are used in an AND function to finally determine the presence of a differential fault. If both IED's agree that a fault is present a final Diff Fault for the line section is issued by both devices. In Table 2b we reach a binary 1 result in both relays thus differential fault detected.

Upon detecting a fault in this example, F2 and F3 breakers can be opened to isolate the fault.

Peer-to-peer messages are used to distribute the RMS values to local differential equations and stage status information.

The testing method can also be used to act as a permissive tripping scheme to allow faster disconnection for low current or high impedance faults. Moreover, broken conductor detection can also be used to disable the differential function if desired.

The problem of slow switching is solved by using Ethernet based protocol IEC61850 as opposed to Serial DNP 3 communication protocols. The Ethernet provides a high-speed data bus and IEC61850 provides GOOSE messages that provide peer to peer capability. IEC61850 was not intended to be used over wireless systems outside the confines of a substation.

Fault isolation and service restoration is also provided using relays as a decentralized system of PLCs. Feeders usually contain several primary switching devices, including circuit breakers, reclosers, and overhead switches that can be used to isolate faulty sections of a line. An overhead switch cannot break fault current, but a circuit breaker or recloser can. If a fault occurs between two switches in a section of line, the first upstream circuit breaker or recloser must be opened before overhead switches can be operated to isolate the faulty section. Then the upstream circuit breaker or recloser can be closed to restore service to unfaulted section of the line.

The information used to make such switching decisions is typically based on the detection of a fault and a determination of its location between two primary switching devices. Furthermore, knowledge of supply current status is used to determine when it is safe to operate a primary switch. A switching procedure can usually be established to isolate a faulty section of line and to restore power to unaffected sections. In an automated system, it is also important to know which mode of operation is being used, for instance auto, simulation, test, and storm modes.

Messaging can be used to distribute fault, status, and mode information between all devices, thus allowing switching functions to be based on data received from the rest of the feeder. GOOSE messaging, for example, can be transmitted at very high speeds over WiMAX networks.

The following steps are taken to realize a FLISR system.

First is the definition of Operating Modes. The definition of operating modes is used when a SCADA system is to perform remote manual operations. The system or an HMI provides operating mode information to all relays in an automated feeder system using source-specific multicast (SSM) commands.

For example, the system provides for operation in the auto, sectional control, restoration, storm, simulation, and load balancing modes. In Auto Mode the system will operate on its own to detect and isolate faults. It can also restore unfaulted sections. If the auto mode is OFF the control of individual switches is possible from the control points. In Sectional Control Mode the operator can open a line section to preprogrammed logical steps. The Restore Mode is used to restore the system to the normal state once the fault has been repaired. The Storm Mode is provided to give a user the ability to change the operation of the protection as well as the operational sequences. The Simulation Mode provides the ideal test tool to test the operational sequences of the system. The controllers will mimic the operation of the primary switches and provide feedback to the HMI's. In the Load Balancing mode the system will indicate the best possible open point in a feeder to distribute the load evenly between two sources. Alarms provide operational and non-operation data to the control points and to SCADA.

The system can include a multiple control points. Three control points can be used, one being an HMI connected through a substation computer, with the other two each being a relay with a programmable graphic interface wired into two circuit breakers supplying the feeder. In addition to providing protection, the relays provide mode and control information to the other devices using GOOSE messaging, thus making it the most basic form of control.

Local protection and control logic functions including hot line tag, protection trip, lockout, and battery status information may be included in the programming of each relay. A standard fault detection and control logic relay file can be created for a circuit breaker, a recloser, and a disconnect switch.

Fault Detection is performed independent of the SCADA during the operation of the protection to identify a faulted section. Fault Isolation is a series of sequential steps that lead to isolation of a faulted section. A mix of reclosers, switches and circuit breakers can be switched in preprogrammed sequences. Overloading of a line section can be detected and reported to the operator.

Next is the definition of Status Information. The system status information used to make an informed switching decision, including the position of each primary switching device on a feeder, is defined. The 52a and 52b contact information is used and transmitted between all relays. Each relay thus has real-time information about the status of the entire feeder. The system is based on information shared between all controllers. GOOSE messages related to the modes of operation, the status and fault information are shared between all controllers. A sequence of operation is thus selected by the mode of operation and current status. This sequence will then start to execute as soon as the fault detection element identifies a fault in the system. Any operation is thus dependant on a Mode and a Status and Fault Next is the definition of Logic Sequences. Each operation is a simple logic AND gate if fulfilled will case an operation of a switch. There could be numerous and gates in each device for different operational requirements. Because the operating speed of GOOSE messaging over WiMAX is sufficiently fast to perform the required sequential switching logic, it allowed the elimination or minimization of the use of timers in the system. This approach ensures the system would not have any race conditions caused by communication and or changing communication system conditions.

The first step in defining logic sequences is to determine the actual operating sequences required for a particular feeder. The approach uses, for example, a graphical tool created in a spreadsheet to plan all the sequences. After the switching devices on the feeder are specified, directional conventions and normal operating status are defined.

Figure 9D:
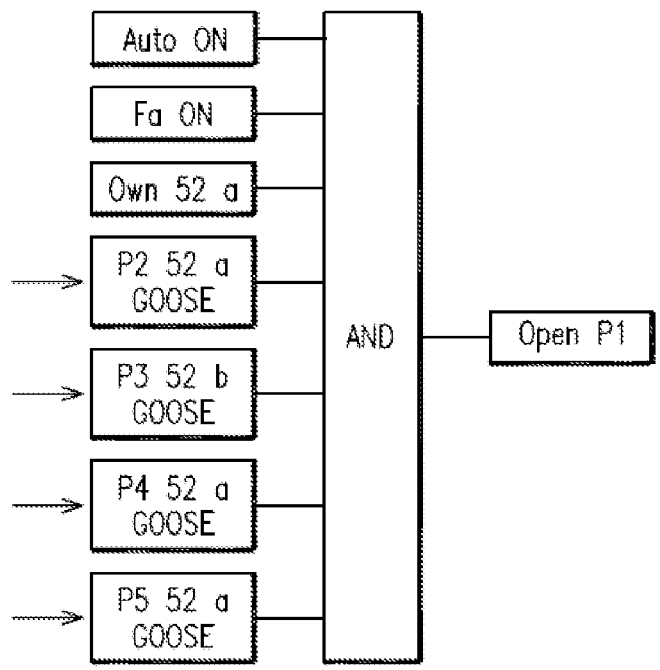
FIG. 9d shows distributed sequential logic.
Figure 9A:
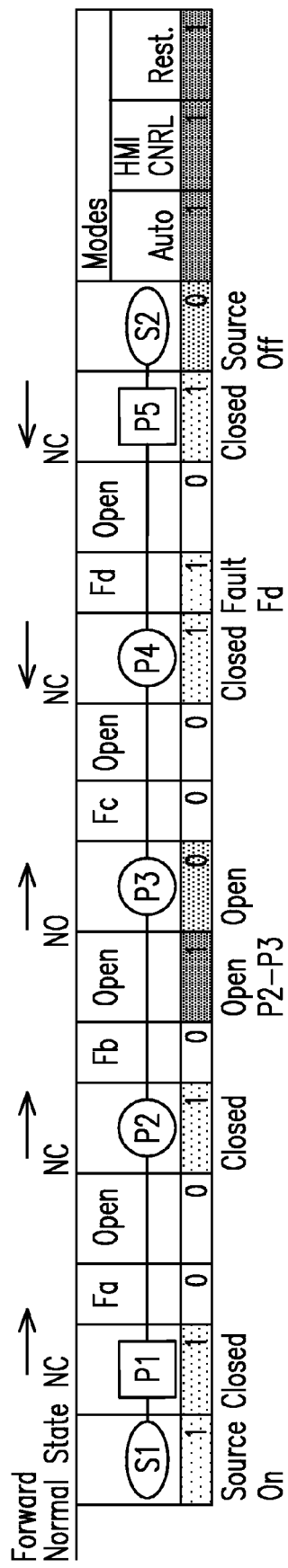
FIG. 9a shows a test feeder operational sequence.

Information regarding operating mode, primary switch status, feeder section faults, and sectional control are included. All information is preferably given in binary form as indicated in the bars located below the feeder representation in FIG. 9a. A color system may be used to simplify planning and highlight changes.

The second step is to list all possible logic sequences for a feeder. The list includes, for example, the following sequences: A fault on each line section; Restoration for each isolated line section; Transfer logic for loss of source; Sectional isolation; Sectional restoration; and Load balancing.

Figure 9B:
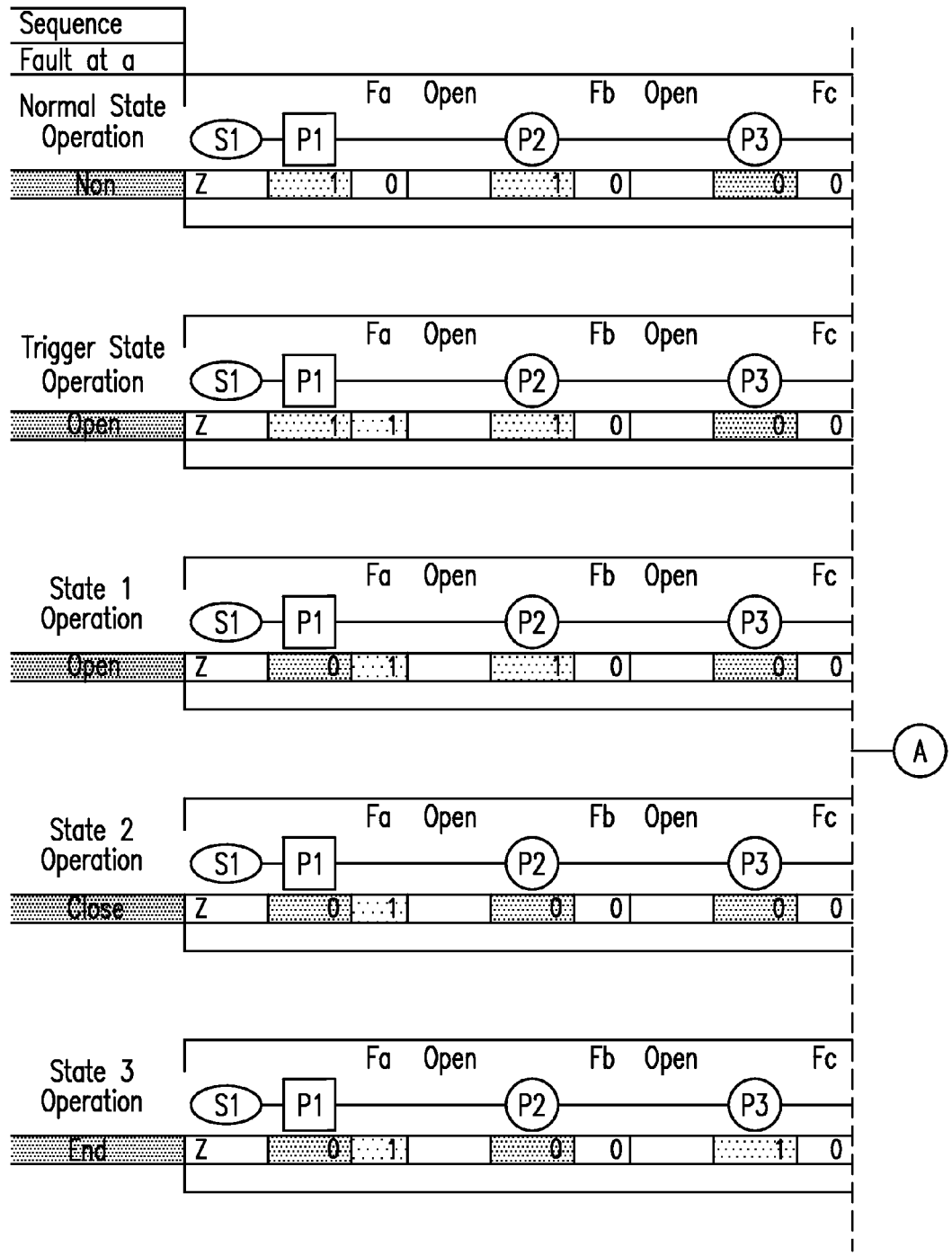
FIG. 9b shows feeder logic sequences.
Figure 9C:
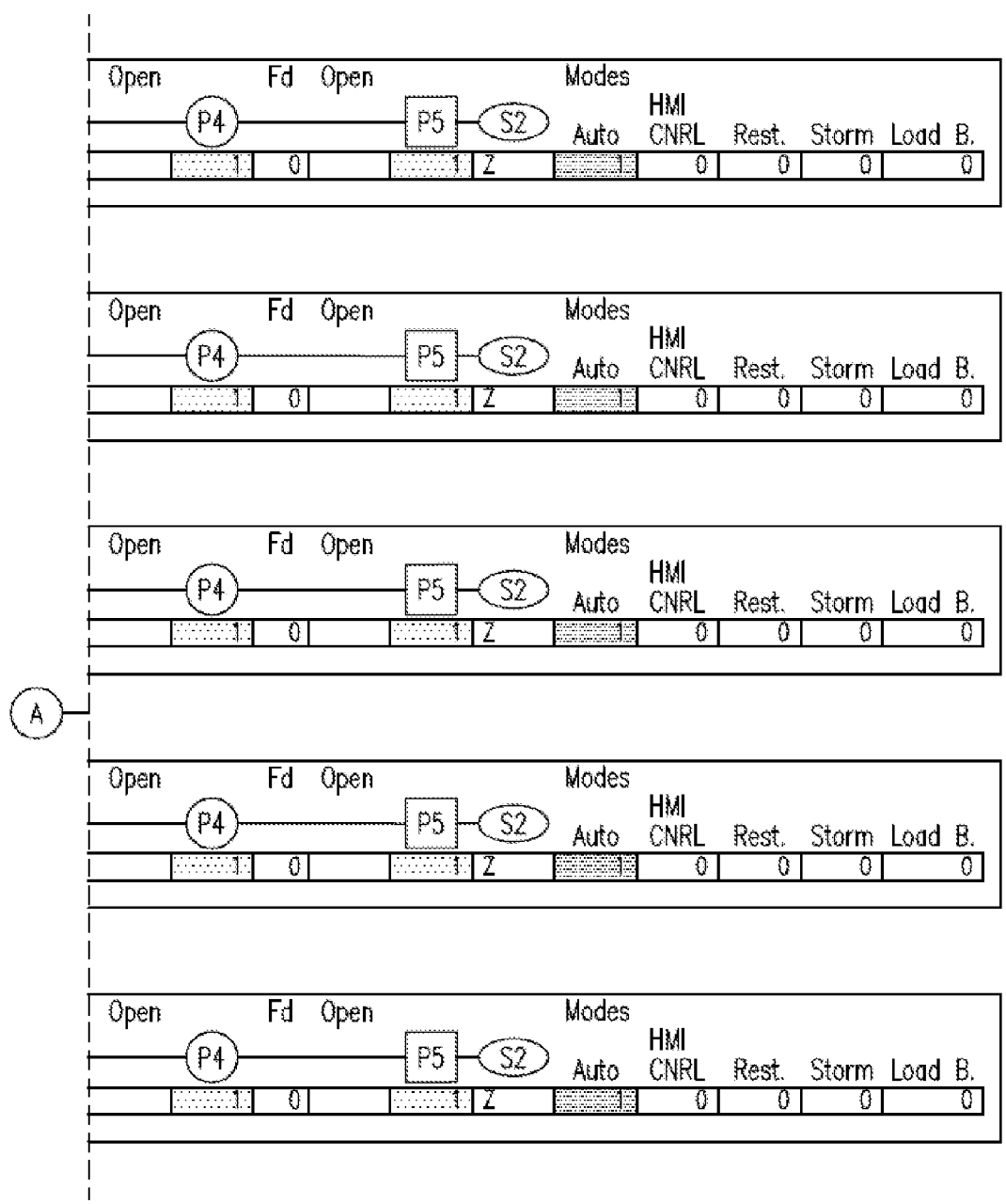
FIG. 9c shows feeder logic sequences, as a continuation of FIG. 9b.
Figure 10A:
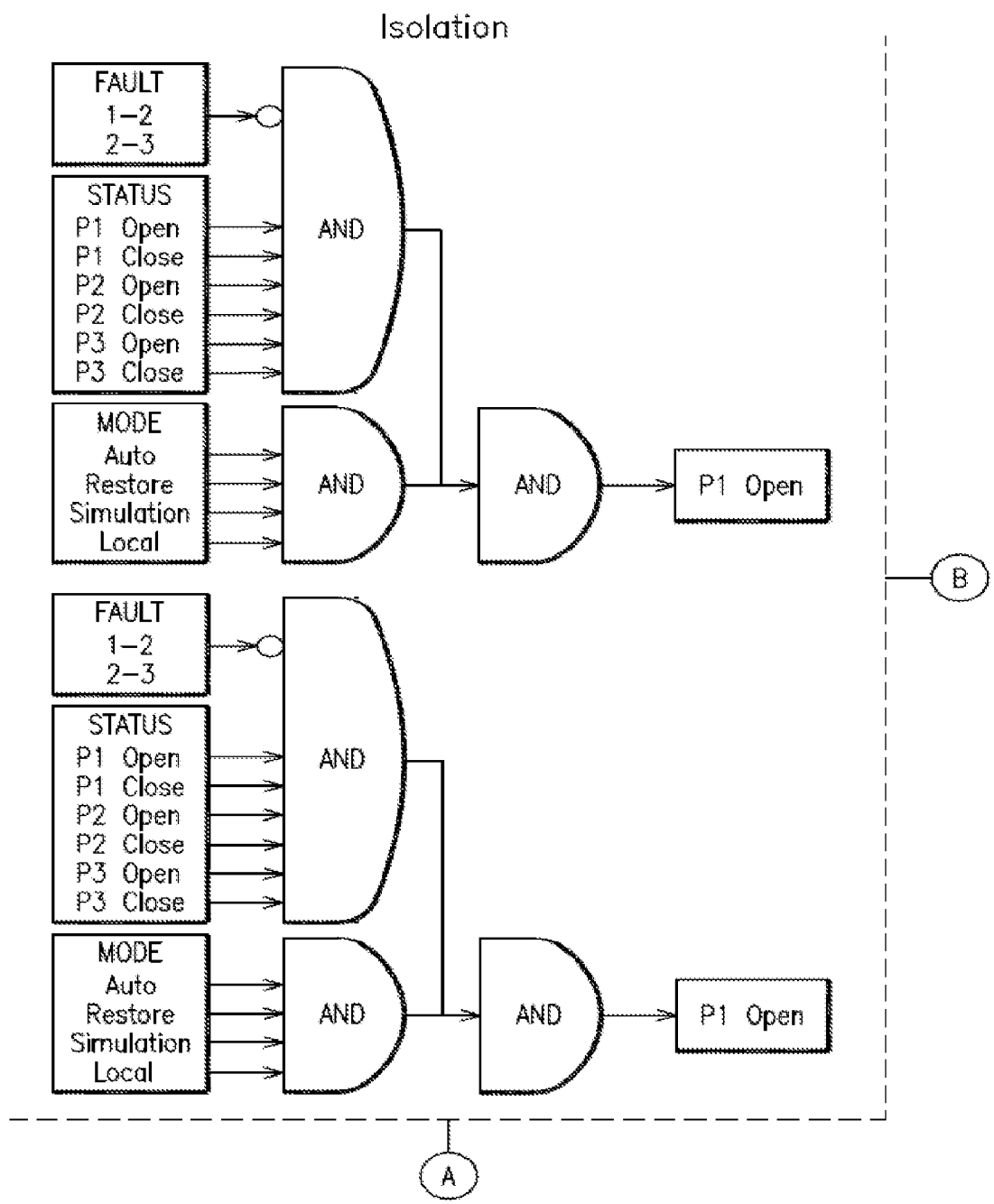
Figure 10B:
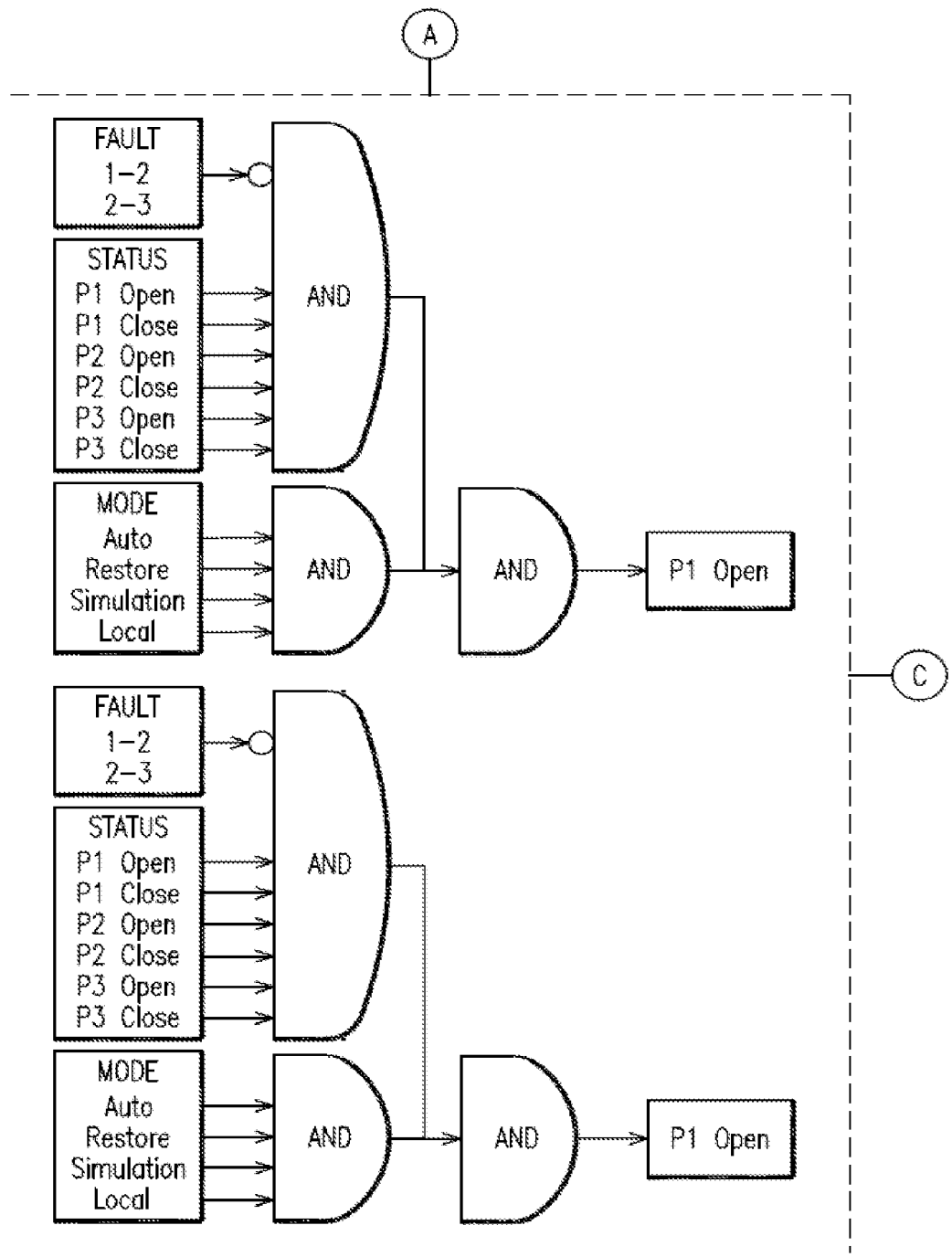
Figure 10C:
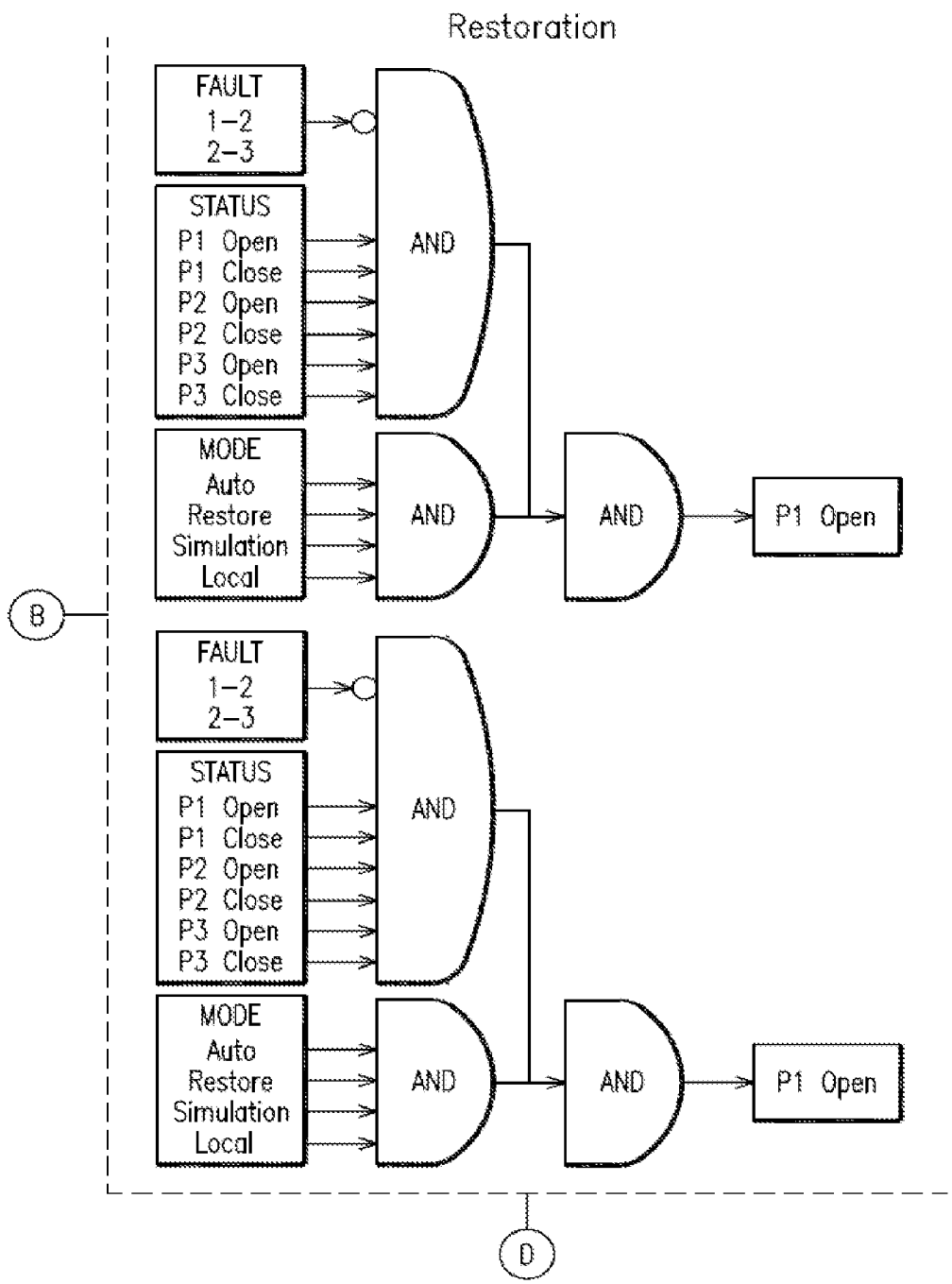
Figure 10D:
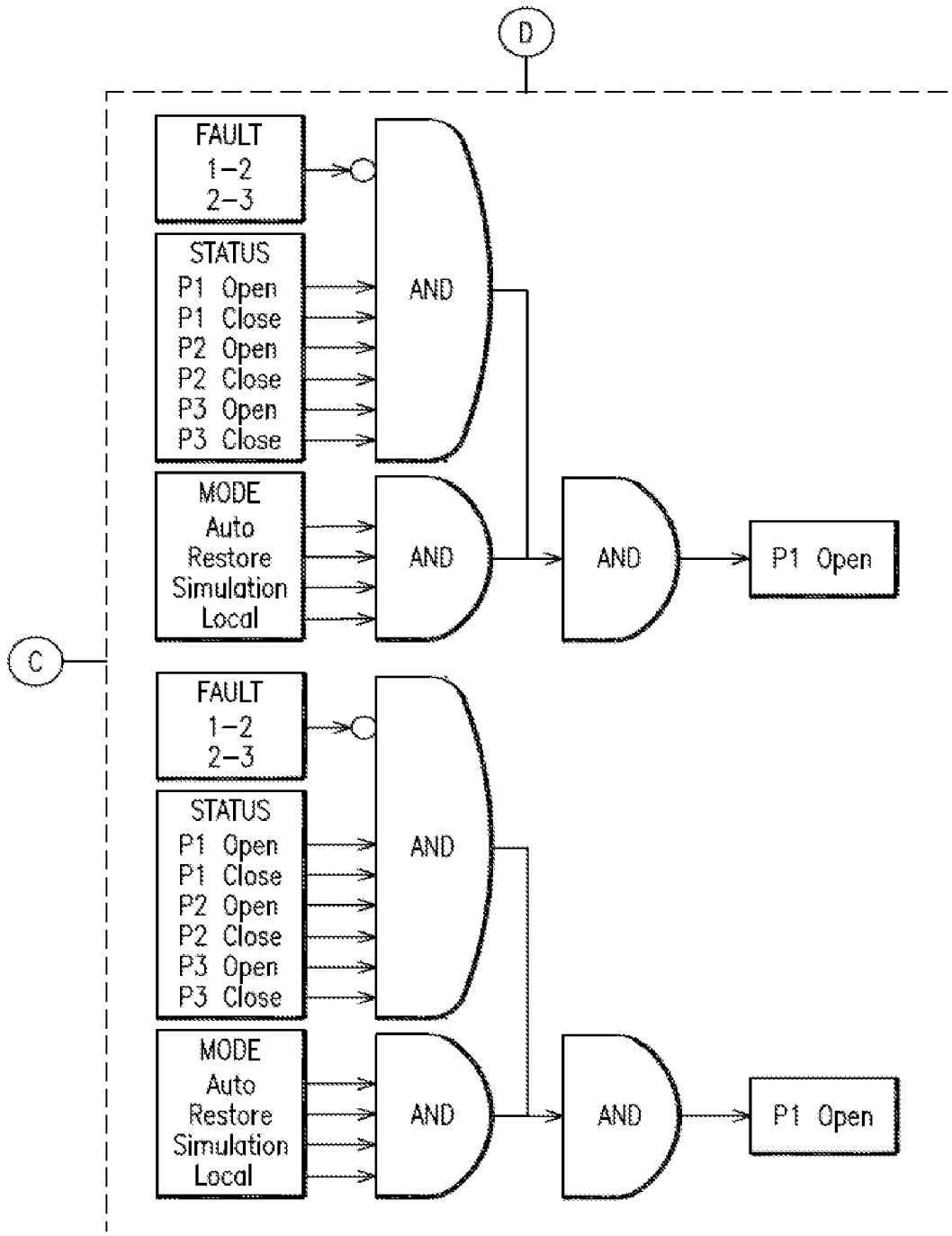

The actual list may contain, for example, 24 possible sequences that can be considered. The process includes the definition of complete logic sequences as shown in FIG. 9b.

The first state indicates a normal state. The second state indicates that a fault has occurred (change to binary 1) and that an operation to open circuit breaker P1 is required by the relay in P1. This is called the trigger state. In the third state, the P1 circuit breaker has changed from binary 1 to binary 0, indicating that an operation to open recloser P2 must be issued by the relay in P2. In the fourth state, the P2 recloser changed from binary 1 to binary 0, indicating an operation to close recloser P3 must be issued by the relay in P3. This completes the first sequence.

Next is Programming the Logic into Relays. Relay logic programming is accomplished using the following procedure. Each binary information string is programmed as an AND gate into the relay logic. For the sequence indicated in FIG. 9b, an AND gate in relay P1 must be programmed to open the circuit breaker according to the binary string information located below the graphic feeder representation for the trigger state. This logic is depicted simply in FIG. 9d. The next AND gate is then programmed in relay P2, and the last in P3, thus creating a simple distributed sequential logic system.

The programming procedure for a complete feeder system can be automated by development of software tools for desired operation in very little time. For the feeder discussed above, in an example embodiment, 125 AND gates or operations were programmed into the relays.

A bench test simulation setup may also be implemented on the relays to speed up the testing of the sequences. Software tools can be developed to include all sequences to be tested.

The simulation tool essentially could mimic the primary switches and apply faults and restore commands to the relays. The tool is also used in field commissioning to prove the entire system without switching a primary device or disrupting service to consumers.

GOOSE message management is handled mostly by the IEC61850 configuration tool. All messages can be assigned a priority rating of 7, the highest possible. Each relay preferably sends out one message to keep data traffic to a minimum. A typical GOOSE message contains at least 120 bytes of overhead data, and every bit of binary data adds 10 bytes to the size of the message. The aim is to keep the data budget below 500 kb/s at each switching device so that a 10 Mb/s communication system supporting 20 devices could be used at acceptable levels.

The relay at P1 contains 37 different binary information bits in a single GOOSE message that is made available to the other relays in the system. This adds no more than 500 bytes of data to the communication system. Therefore, there is sufficient capacity to expand communication functionality and features. A GOOSE terminology table is created to simplify programming and to make it more understandable.

An example WiMax System will now be described. These systems typically employ a Web-based configuration wizard that can be accessed through a standard browser. Base station configuration includes an operating mode setting, which is set for standalone operation. The IP address and Subnet mask are also configured.

An IP address management system is used to simplify identification of device types and their locations within the system. The configuration for the switching mode may be set for L2 switching. The frequency may be set to 3,600,000 KHz, and the transmit power to 12 dBm at a bandwidth of 10 MHz.

Subscriber unit settings are applied through a similar process using a Web interface. The first setting adds a channel to the scanner. The frequency may be set to 3,600,000 KHz and the transmit power to 12 dBm for the channel. Frame duration may be set to 5 ms, and IP address and subnet information are entered.

System Scheduling Service plays a significant role in the amount of latency experienced. During initial testing, a default setting of BE or best effort may be used with the base station. Use of the UGS or unsolicited grant service setting may be recommended for use with relays in the system. This setting improves the latency of the GOOSE messages significantly.

Peer to Peer status sharing on information using IEC61850 "GOOSE" is provided. It removes the need to have a master device thus reduce the cost of this system. It improves the speed of operation by removing the inherent latencies of a master slave system. The solution included minimizing the number of GOOSE messages as well the naming conventions required to make programming understandable and repeatable.

The solution further provides novel grouping of GOOSE messages in functional groups. The groups include fault detection, modes, and status.

Figure 3:
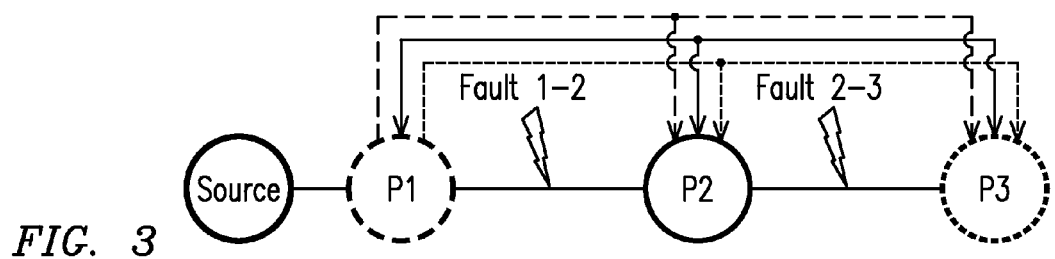
FIG. 3 is a block diagram showing peer-to-peer fault detection.

Fault Detection (P1-3 Switch or Recloser) is shown in FIG. 3. Fault detection is shared using GOOSE. The fault position is detected and is used as a trigger to start sequential isolation operation. The fault detection or location of the fault when detected will make this information known to the other relays in the system. This information is typically used as a trigger for by the system to start a sequence of system switching operations to isolate only the faulted line sections and restore power to fault free sections.

The fault information when detected is sent from the devices connected to a line section to all other devices using GOOSE messages. This information Fault information will remain at a logical high until it is reset by an operator or linemen at the device located at the switching location.

If a fault is detected in the line section between P1 and P2 by the relays located at P1 and P2 the relays would then both set an RS flip Flop memory function to indicate Fault 1-2 is logic high or present. This logic high information that Fault 1-2 is present is sent out by both devices as a Goose Message for other devices in the system.

The Fault 1-2 high will be sent out as a Goose message for example by P1' the relays at P2 and P3 will subscribe to this information from P1.

The Fault 2-3 high will be sent out as a Goose message for example by P2, the relays at P1 and P3 will subscribe to this information from P1.

Figure 4:
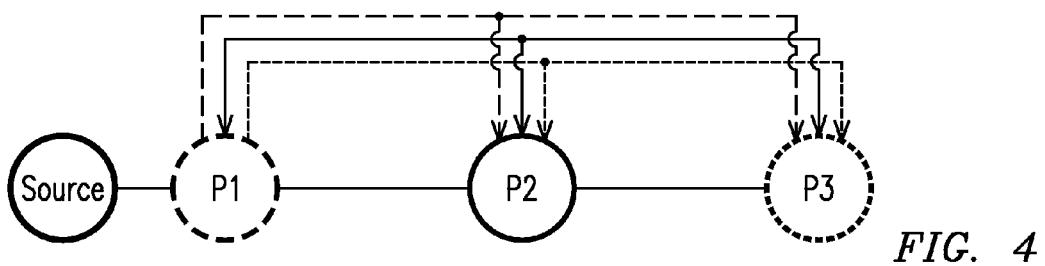
FIG. 4 is a block diagram showing peer-to-peer status sharing.

Status Sharing (P1-3 Switch or Recloser) is shown in FIG. 4. Status information is shared using GOOSE (Open/Closed). It is used as a trigger for sequential operation. A device can only operate once a status from another device is changed.

Status sharing is important information that needs to be shared by all devices. This creates a system were by each of relays at P1, P2 and P3 is fully aware of the entire system topology. This information is used to create a sequential series of operations. A sequential system is very stable and immune to system switching racing conditions. The relay P1, P2 and P3 is connected through hard wires to the associated primary switch through binary inputs. The contact information indicates if the primary switch is open or closed. The open and closed information is sent out as a Goose message from P1, P2 and P3 providing the real time status of the associated primary switchgear. P1 will subscribe to the status information of P1 and P3. P2 will subscribe to status information from P1 and P3. P3 will subscribe to status information for P1 and P2.

Figure 5:
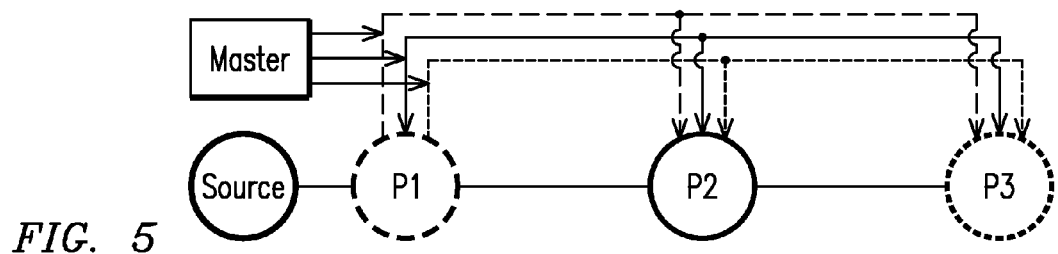
FIG. 5 is a block diagram showing peer-to-peer mode sharing.

Mode Sharing (P1-3 Switch or Recloser; Master=RTU or substation controller or SCADA or P1, P2, P3 or combination of all) is shown in FIG. 5. Mode information is shared using GOOSE or through central command from SCADA. It includes Automatic mode (On/Off), Restore (On/Off), Simulation mode (On/Off) and Local. It is used as logic operation selection switch for sequential operation. A device can only operate once a mode from another device has changed.

Mode sharing is used to select a programmed operational sequence to be followed by the relays in a group. This information can be provided to the relays in P1 P2 and P3 via various means. The information can be provided through traditional select switches wired to binary inputs of relays for example to the relays situated in P1. P1 will then send a goose massage to P2 and P3 to inform them of the selected operational mode. The information can also be supplied by an RTU or a SCADA system to the relays through an additional communication interface. Mode information can include various modes for example Auto, Restoration, Storm Mode, Sectional Control Mode or any mode that could lead to the selection of a different sequence that needs to be performed.

Figure 6:
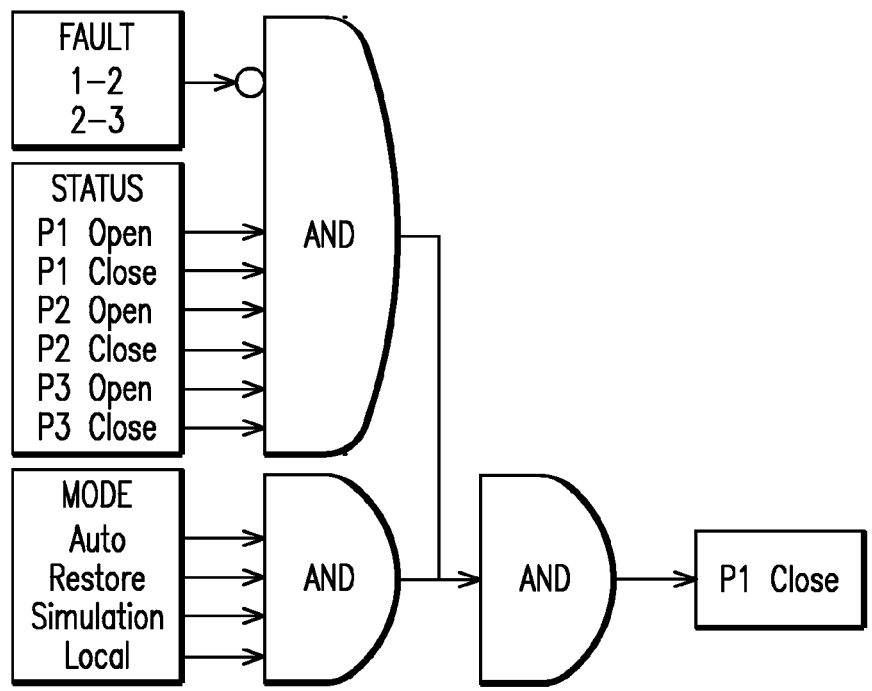
FIG. 6 is a block diagram showing peer isolation logic.
Figure 7:
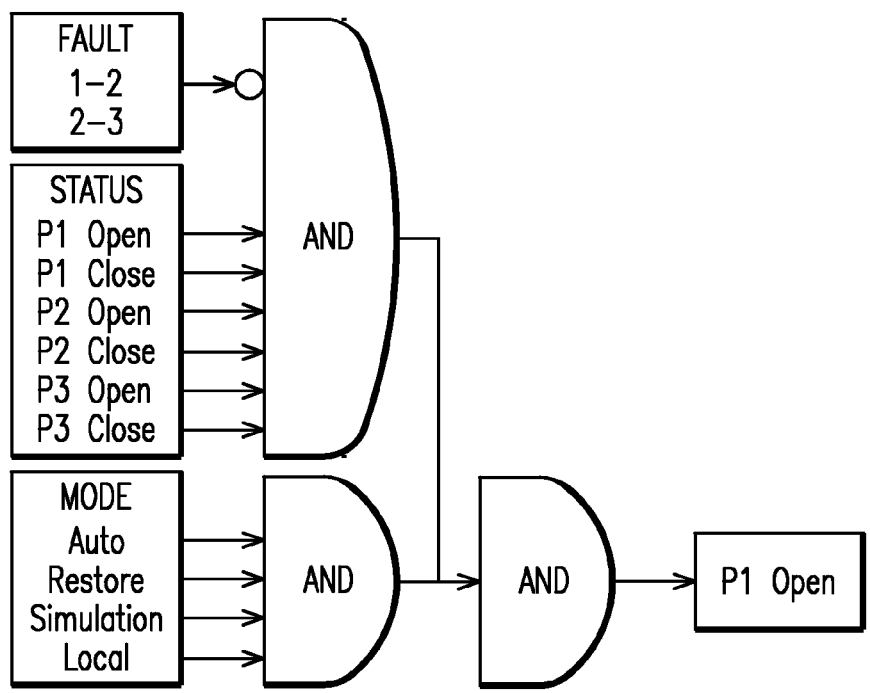
FIG. 7 is a block diagram showing peer restore logic.

Simple logic gates are used to build advanced logic systems as depicted in FIGS. 6 and 7. The use of simple logic makes the system very easy to implement and understand. This results in a novel feeder automation using GOOSE and protective relays or IED's. FIG. 6 (Peer Restore Logic) shows the number of gate inputs used to generate sequential operations based on Faults, Status and Mode. One similar logic program is used for each system switching operation. FIG. 7 (Peer Isolation Logic) shows the number of gate inputs used to generate sequential operations based on Faults, Status and Mode. One similar logic program is used for each system switching operation.

The Fault, Status and Mode Goose information that each relay subscribes to is configured into a series of and gates in the relay PLC function to perform an operation. This operation in FIG. 6 depicts the information used for the relay to issue a close or open command to the connected primary switch. If all the AND gate inputs are high the output of the AND gate will go high. This logic high information is configured to a binary output of the relay that is connected through hard wires to the primary switch operating circuits to close or open the primary switch. One AND gate can be used to perform the logic as depicted in FIGS. 6 and 7. The depiction of 3 AND gates were merely used to clearly separate the fault and status information generated by the relays and the modes generated for an external source.

A simple sequential switching logic programming technique is provided. A novel programming process is used to produce logic fast and accurately by means of a graphical representation followed by a sequential table. See FIG. 8. This technique provides a delivery process that can be followed, simple step by simple step, to create an advanced logic system that will switch sequentially. Sequential tripping is a prerequisite for fast operation. The system overcomes the varying latency of a wireless system with IED's and WiMax without a master, creating a process to program a peer to peers logic system that is immune to communication and operating speeds of primary switching equipment.

This figure depicts the complete process from planning to implementation of the required sequential sequences from.

Figure 8:
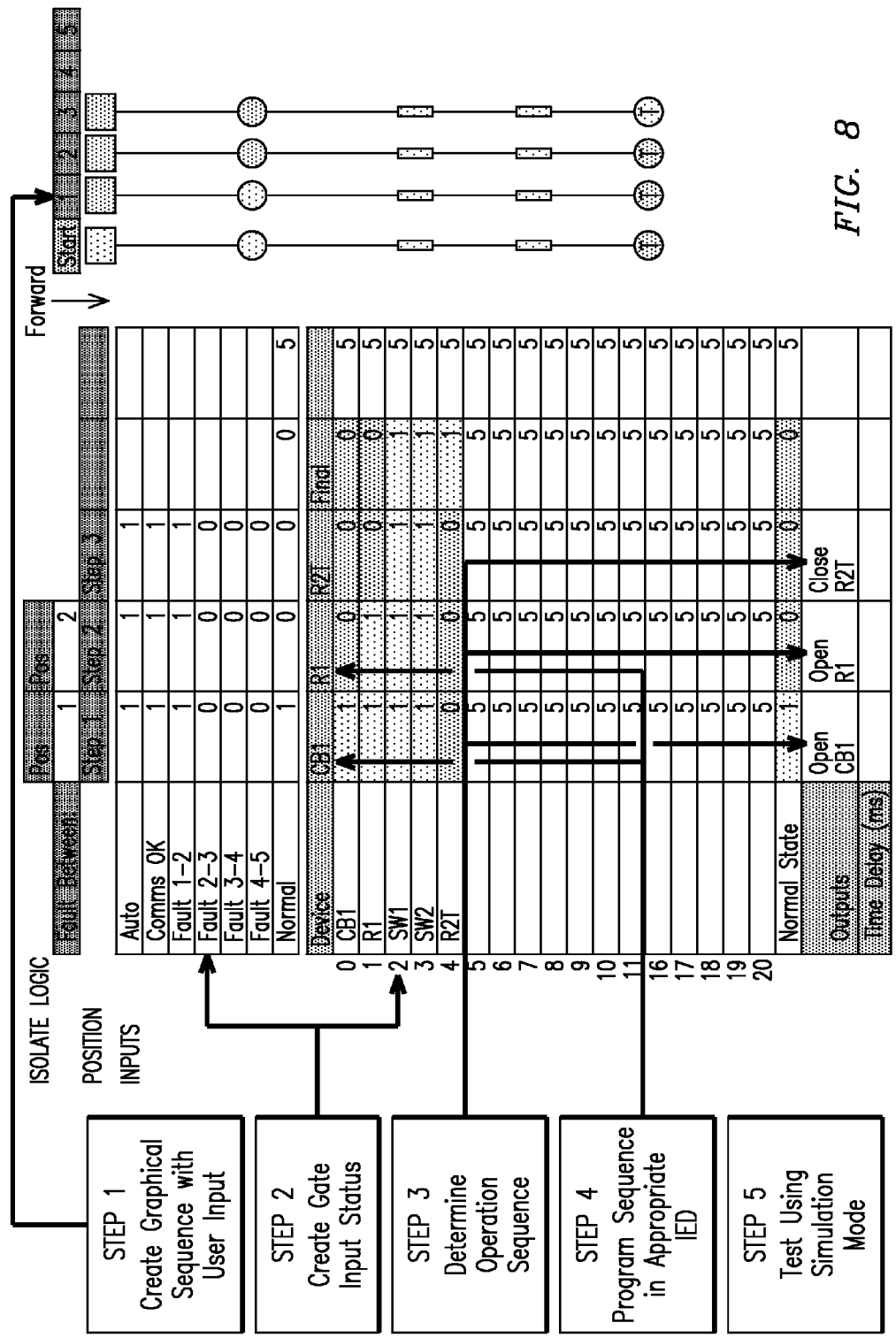
FIG. 8 shows IED programming process.

The first step is to create a graphical depiction of the topology of the feeder and to make certain assumptions like the direction of power flow in the feeder. The topology in FIG. 8 shows a circuit breaker connected to a recloser connected to a switch connected to a switch and finally connected to a recloser. The bottom recloser's connection to the adjacent feeder is not show in this depiction.

The status of each primary switch can be depicted by a change of color or through a changing symbol indicating the position. In FIG. 8 red indicate a closed position of a primary switch and green an open position.

The through graphical means the planning is done to show how the feeder primary switch statuses must change in order to isolate a faulted section and restore power to the un-faulted line sections. In the planning section "step 1" the sequences steps can be described as: Normal status of the feeder with a fault detected between the circuit breaker and the first recloser.

Step 2 shows that the circuit breaker is required to open.

Step 3 indicates that the recloser must open effectively isolating the faulted section.

Step 4 indicates the closure of the bottom recloser required to provide power to the line from the adjacent source or feeder.

The next step is to turn this graphical information into binary information of logical high "1" or low "0" in a table or spread sheet. Each step is now represented by a series of high and low information. At the bottom of the table an output or action is entered based on the graphical planning done before.

IED programming is built from simple and/or gates to achieve complex sequential switching schemes. The process is designed to build custom systems quickly and effectively. IED Programming may comprise the following steps. Step 1, Program base Control and Simulation Logic desired operational Modes. Step 2 Create new topology according to graphical plan and program Status and Mode, inputs and outputs in relay. Step 3 Assign all Goose Messages. Step 4 Interconnect Connect all Status, Mode and Fault Indication GOOSE messages in IEC61850 configuration tool and test. Step 5 Program all Isolation and Restoration logic per Isolation and Restoration sequence tables. Step 6 Connect all relays to a switch to form a private Ethernet network.

Thereafter, each logic step may be tested after completion of programming through simulation functionality (each IED is equipped with simulation mode), including applying faults and performing dynamic test for complete sequence and applying restore and performing a dynamic test for a complete sequence. This function has big advantages during the development of the system logic. Logic can be tested immediately following the programming of the logic on the IED's connected to communication network. The system can thus be bench tested without being installed in primary switching equipment. After logic development the customer will now have the ability to lab test the intended system prior to erection of primary equipment. Once installed in the field the entire system can be tested to the SCADA system without switching the primary gear and interrupting consumers. A simple open close of each piece of primary switching equipment will lastly be required. This will shorten commissioning and times and inherent outages to consumers.

The simulation mode models the operation of the switch devices by effectively disconnecting the protective relays from the system. Operator HMIs receive simulated system status information as if the system were actually online and operating. Simulated faults can be applied to line sections to test operations sequences without changing the physical status of any primary switch device. The performance and functionality of an entire FLISR system, including the related communication network, can be tested and evaluated.

The solution provides a switch over logic in the IED's. The IED's were not designed with this functionality in mind. Interlocking also presented problems but both issues were overcome by using double point commands in the IED's. Each IED is equipped with simulation mode. Mode Actions when on include: Disconnect output logic to IED open and close contacts, Connect to RS Flip Flop logic, Disconnect Position Status from Binary inputs, and Connect Position Status to RS Flip Flop.

The system is based on one IED that is typically used as a distribution feeder protective relay with IEC61850 communication. The system can use off the shelf programming software for the IED's that is simple to use.

While the invention is described in terms of several preferred embodiments, it will be appreciated that the invention is not limited to circuit interrupting and disconnect devices. The inventive concepts may be employed in connection with any number of devices including circuit breakers, reclosers, and the like. When faults are detected, breakers are tripped, alarm indications are sent to system control, or other protection schemes may be initiated.

Logic units utilized in an overall system for microprocessor based protective devices as known in the art may include input transformers, low-pass filters, sample-hold amplifiers, multiplexers, programmable gain amplifiers, A/D converters, and the like.

Peer-to-Peer communication (such as generic-object-oriented substation event (GOOSE) messages of the IEC 61850 standard) enables distribution relays to communicate with others connected to the communication network without having a master device. As such, any relay can reconfigure the distribution system after a fault occurs depending on programming. Any of a number of peer-to-peer communication schemes are contemplated herein.

Computer program code for carrying out operations of the invention described above may be written in a variety of languages for development convenience. For example, PLCs may be programmed using application software on personal computers, using standards-based programming languages (e.g., IEC 61131-3). PLCs are generally programmed using application software on personal computers. The computer is connected to the PLC through Ethernet, RS-232, RS-485 or RS-422 cabling. The programming software allows entry and editing of the ladder-style logic. (Ladder Logic Diagram Programming). Ladder logic is a programming language that represents a program by a graphical diagram based on the circuit diagrams of relay-based logic hardware. It is primarily used to develop software for Programmable Logic Controllers (PLCs) used in industrial control applications. The name is because programs in this language resemble ladders, with two vertical rails and a series of horizontal rungs between them.

The functionality of the PLC includes, for example, sequential relay control, motion control, process control, distributed control systems and networking. In certain instances, PLRs (programmable logic relays) may be used. Most modern PLCs can communicate over a network to some other system, such as a computer running a SCADA (Supervisory Control And Data Acquisition) system or web browser. In addition, computer program code for carrying out operations of embodiments of the present invention may also be written in other programming languages such as a dialect that resembles BASIC or C or other programming language with bindings appropriate for a real-time application environment.

Code in which a program of the present invention is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, DVD. The present invention can be configured for use in a computer or an information processing apparatus that includes a memory, such as a central processing unit (CPU), a RAM and a ROM as well as a storage medium such as a hard disc.

The "step-by-step process" for performing the claimed functions herein is a specific algorithm and is shown in the text of the specification as prose and/or in the flow charts. The instructions of the software program create a special purpose machine for carrying out the particular algorithm. In any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general-purpose computer, or microprocessor, may be programmed to carry out the algorithm/steps of the present invention creating a new machine. The general-purpose computer/microprocessor becomes a special purpose computer once it is programmed to perform particular functions pursuant to instructions from program software of the present invention. The instructions of the software program that carry out the algorithm/steps electrically change the general-purpose computer/microprocessor by creating electrical paths within the device. These electrical paths create a special purpose machine for carrying out the particular algorithm/steps.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for facilitating automated fault isolation and service restoration in power distribution networks having protective relay devices, comprising:
    programming into each of the protective relay devices a plurality of operational sequences that when executed control associated switching devices when a fault detection element identifies a faulted section in the network, wherein each operational sequence is selected for execution based on system status information and fault information;
    sharing system status information and fault information via peer-to-peer messaging between protective relay devices via a high speed communication system; and
    executing an isolation operation comprising a proper operational sequence based on system status information and fault information shared between protective relay devices to isolate the faulted.

2. The method of claim 1 wherein the system status information comprises a position of each primary switching device on a feeder.

3. The method of claim 1 wherein the fault information comprises fault positions detected and is used as a trigger to start the isolation operation.

4. The method of claim 1 further comprising storing operation mode information comprising one or more of automatic mode, sectional control mode, restoration mode, storm mode, simulation mode, and load balancing mode.

5. The method of claim 1 further comprising storing operation mode information comprising one or more of automatic mode that provides for automatic operation to detect, isolate, and restore faults; sectional control mode that provides for opening of a line section to preprogrammed logical steps; restoration mode that provides for restoration to a normal state once the fault has been repaired; storm mode that provides for changing operation of the protection as well as the operational sequences; simulation mode that provides for testing the operational sequences; and load balancing mode that provides for indication of a best possible open point in a feeder to distribute a load evenly between two sources.

6. The method of claim 1 wherein the operational sequences comprise logic sequences implemented using a plurality of logic gates.

7. The method of claim 6 wherein the logic gates comprise logic AND gates representing a binary information string programmed into relay logic that when fulfilled will cause an operation of a switch device and together with the switching devices of the system creates a distributed sequential logic system.

8. The method of claim 7 wherein the logic information is configured to a binary output of the relay that is connected to a primary switch operating circuits to close or open the primary switch.

9. The method of claim 1 wherein one or more of reclosers, switches and circuit-breakers are activated to isolate the faulted section in a series of sequential steps.

10. The method of claim 1 wherein the protective relay devices comprise intelligent devices having a microprocessor and a communication system.

11. A system for facilitating automated fault isolation and service restoration in power distribution networks, comprising:
    a plurality of protective relay devices each comprising a processor;
    a communication device that provides peer-to-peer communication between the protective relay devices, wherein each communication device provides for sharing of system status information and fault information via peer-to-peer messaging between protective relay devices via a high speed communication system;

wherein each protective relay device has programmed therein a plurality of operational sequences that when executed control associated switching devices when a fault detection element identifies a faulted section in the network, wherein each operational sequence is selected for execution based on system status information and fault information, such that an isolation operation comprising a proper operational sequence based on system status information and fault information shared between protective relay devices is executed to isolate the faulted section.

12. The system of claim 11 wherein the system status information comprises a position of each primary switching device on a feeder.

13. The system of claim 11 wherein the fault information comprises fault positions detected and is used as a trigger to start the isolation operation.

14. The system of claim 11 wherein each communication device provides for sharing of operation mode information comprising one or more of automatic mode that provides for automatic operation to detect, isolate, and restore faults; sectional control mode that provides for opening of a line section to preprogrammed logical steps; restoration mode that provides for restoration to a normal state once the fault has been repaired; storm mode that provides for changing operation of the protection as well as the operational sequences; simulation mode that provides for testing the operational sequences; and load balancing mode that provides for indication of a best possible open point in a feeder to distribute a load evenly between two sources.

15. The system of claim 11 wherein the operational sequences comprise logic sequences implemented using a plurality of logic gates.

16. The system of claim 15 wherein the logic gates comprise logic AND gates representing a binary information string programmed into relay logic that when fulfilled will cause an operation of a switch device and together with the switching devices of the system creates a distributed sequential logic system.

17. The system of claim 16 wherein the logic information is configured to a binary output of the relay that is connected to a primary switch operating circuits to close or open the primary switch.

18. The system of claim 11 wherein one or more of reclosers, switches and circuit-breakers are activated to isolate the faulted section in a series of sequential steps.

19. The system of claim 11 wherein the protective relay devices comprise intelligent devices having a microprocessor and a communication system.

20. A non-transitory computer-readable medium comprising instructions that, when executed by a processor, implement the steps of claim 1.

* * * * *